US010164784B2

(12) United States Patent
Horiuchi et al.

(10) Patent No.: US 10,164,784 B2
(45) Date of Patent: Dec. 25, 2018

(54) COMMUNICATION TERMINAL, COMMUNICATION SYSTEM, AND DATA TRANSMISSION METHOD

(71) Applicants: Takeshi Horiuchi, Tokyo (JP); Naoki Umehara, Kanagawa (JP); Hiroshi Hinohara, Kanagawa (JP); Atsushi Miyamoto, Kanagawa (JP); Takuya Soneda, Kanagawa (JP)

(72) Inventors: Takeshi Horiuchi, Tokyo (JP); Naoki Umehara, Kanagawa (JP); Hiroshi Hinohara, Kanagawa (JP); Atsushi Miyamoto, Kanagawa (JP); Takuya Soneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/447,568

(22) Filed: Mar. 2, 2017

(65) Prior Publication Data
US 2017/0264450 A1    Sep. 14, 2017

(30) Foreign Application Priority Data
Mar. 9, 2016   (JP) .................................. 2016-045970

(51) Int. Cl.
*H04L 12/18*    (2006.01)
*H04L 29/06*    (2006.01)
(Continued)

(52) U.S. Cl.
CPC .......... *H04L 12/1827* (2013.01); *H04L 12/18* (2013.01); *H04L 51/043* (2013.01);
(Continued)

(58) Field of Classification Search
CPC ................................................. H04L 12/4633
(Continued)

(56) References Cited

U.S. PATENT DOCUMENTS

2004/0267939 A1* 12/2004 Yumoto .................. H04L 29/06
                                                                   709/227
2011/0093601 A1     4/2011 Yumoto et al.
(Continued)

FOREIGN PATENT DOCUMENTS

JP        2006-059370     3/2006
JP        2006-174193     6/2006

OTHER PUBLICATIONS

Extended European Search Report dated May 8, 2017 in Patent Application No. 17156499.0.

*Primary Examiner* — Samina F Choudhry
(74) *Attorney, Agent, or Firm* — Oblon, McClelland, Maier & Neustadt, L.L.P.

(57) ABSTRACT

A communication terminal and a method of transmitting data. The communication terminal and the method includes transmitting, at a prescribed timing, first information from the communication terminal to a management system that manages communication between the communication terminal and a counterpart communication terminal, and transmitting from the communication terminal to the management system second information to be sent from the management system to the counterpart communication terminal connected to the management system through a network, when the management system does not receive the first information transmitted from the communication terminal for a prescribed length of time. The second information includes status information of each of a plurality of communication applications that operate in the communication terminal.

8 Claims, 17 Drawing Sheets

(51) Int. Cl.
*H04L 29/08* (2006.01)
*H04L 12/58* (2006.01)

(52) U.S. Cl.
CPC ............ *H04L 67/24* (2013.01); *H04L 67/325* (2013.01); *H04L 69/28* (2013.01)

(58) Field of Classification Search
USPC ........................................................ 370/392
See application file for complete search history.

(56) References Cited

U.S. PATENT DOCUMENTS

2012/0327309 A1* 12/2012 Ikeda .................... H04N 5/4403
    348/734
2013/0268598 A1    10/2013 Tipirneni
2014/0223333 A1*  8/2014 Pegg ................ H04L 29/08684
    715/753

* cited by examiner

FIG. 6A

| USER ID | USER NAME | PASSWORD |
|---|---|---|
| U01 | a | abc |
| U02 | b | def |
| U03 | c | ghi |
| ... | ... | ... |

FIG. 6B

| CLIENT ID | CLIENT NAME | PASSWORD |
|---|---|---|
| C01 | VIDEO COMMUNICATION APPLICATION A | aaaa |
| C02 | VIDEO COMMUNICATION APPLICATION B | bbbb |
| C03 | RELAY DEVICE MANAGEMENT APPLICATION | cccc |
| C04 | INTEGRATED COMMUNICATION CLIENT | dddd |
| ... | ... | ... |

FIG. 6C

| SERVICE ID | SERVICE NAME |
|---|---|
| S01 | TRANSMISSION MANAGEMENT SYSTEM |
| ... | ... |

FIG. 6D

| TOPIC NAME | CLIENT ID | USER ID |
|---|---|---|
| ConfRoom1 | C01 | U01 |
| ConfRoom1 | C01 | U02 |
| ConfRoom2 | C02 | U01 |
| ConfRoom2 | C02 | U03 |
| ConfRoom2 | C03 | U04 |
| Client1/Presence | C04 | U02 |
| Client1/Presence | C04 | U03 |
| ... | ... | ... |

FIG. 8A

| CONFERENCE ROOM ID | TOPIC NAME |
|---|---|
| RoomA | ConfRoom2 |
| RoomB | — |
| ... | ... |

FIG. 8B

| CLIENT ID | USER ID |
|---|---|
| C02 | U01 |
| C02 | U03 |
| ... | ... |

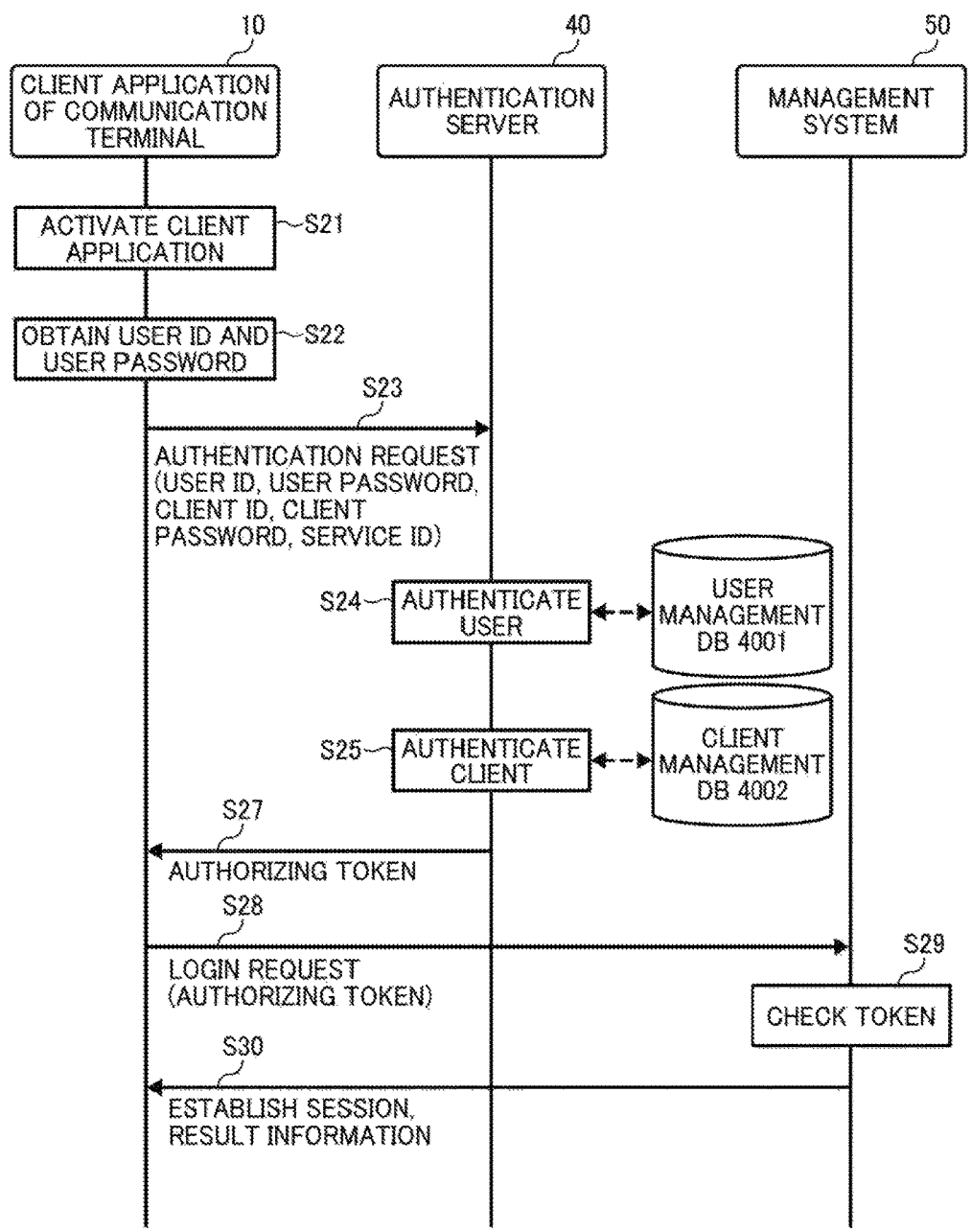

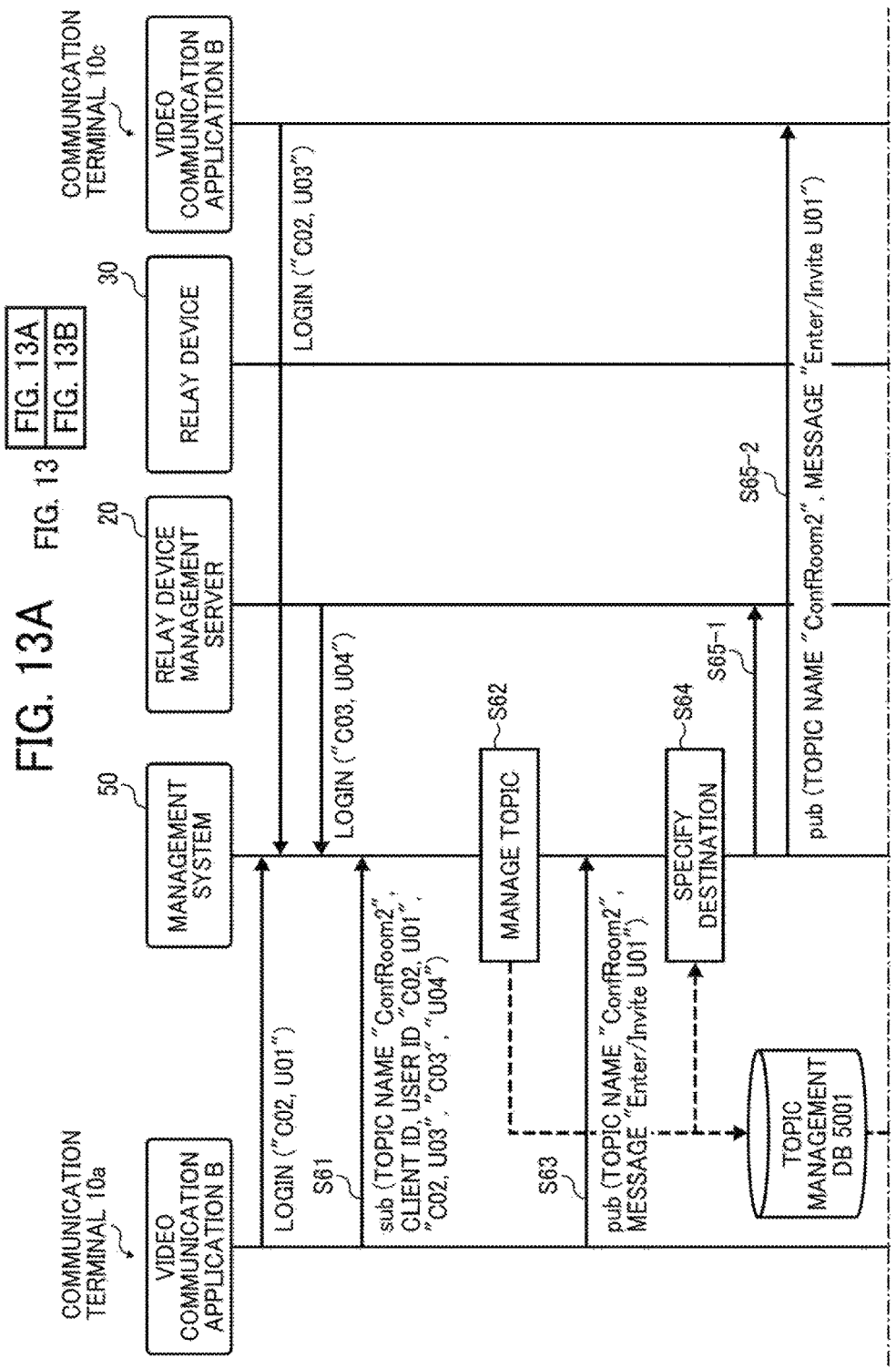

COMMUNICATION TERMINAL, COMMUNICATION SYSTEM, AND DATA TRANSMISSION METHOD

CROSS-REFERENCE TO RELATED APPLICATION

This patent application is based on and claims priority pursuant to 35 U.S.C. § 119(a) to Japanese Patent Application No. 2016-045970, filed on Mar. 9, 2016, in the Japan Patent Office, the entire disclosure of which is hereby incorporated by reference herein.

BACKGROUND

Technical Field

Embodiments of the present disclosure relate to a communication terminal, a communication system, and a data transmission method.

Background Art

With the need for reducing costs or times associated with business trips, communication systems are widely used, which are capable of carrying out videoconferences among remotely located sites through a communication network such as the Internet. When communication among a plurality of communication terminals is started, such communication systems exchange contents of data such as image data and audio data with each other. Accordingly, the communication among the participants who use the communication terminals is realized.

For example, an integrated presence management system is known that includes a communication terminal with a memory or the like in which a plurality of application client programs are stored and a presence server with a memory or the like in which presence information of the communication terminal is stored. When a request to register the presence information of one of the multiple applications of the above communication terminal is received from the communication terminal, the presence server synchronizes the presence information of at least one another application of the above communication terminal, which belongs to the same group as the one of the multiple application of the above communication terminal, with the one of the multiple application of the above communication terminal.

As methods for notifying a counterpart communication terminal of the disconnected communication at a communication terminal, a method is used in which information such as a heart-beat packet is sent, at a prescribed timing, from the communication terminal to a management system that manages the communication. In such a method, the management system notifies the counterpart communication terminal of the disconnected communication at the communication terminal when the information such as a heart-beat packet is no longer sent from the communication terminal. However, when a plurality of communication applications operates in the communication terminal and each of the communication applications sends such information as above to the management system, the load on the communication network increases.

SUMMARY

Embodiments of the present disclosure described herein provide a communication terminal and a method if transmitting data. The communication terminal and the method includes transmitting, at a prescribed timing, first information from the communication terminal to a management system that manages communication between the communication terminal and a counterpart communication terminal, and transmitting from the communication terminal to the management system second information to be sent from the management system to the counterpart communication terminal connected to the management system through a network, when the management system does not receive the first information transmitted from the communication terminal for a prescribed length of time. The second information includes status information of each of a plurality of communication applications that operate in the communication terminal.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 6A to FIG. 6D are diagrams each illustrating an example data structure of a management table, according to an embodiment of the present disclosure.

FIG. 8A and FIG. 8B are diagrams each illustrating an example data structure of a management table, according to an embodiment of the present disclosure.

FIG. 9 is a sequence diagram illustrating authentication processes according to an embodiment of the present disclosure.

FIG. 13A and FIG. 13B are a sequence diagram illustrating the processes of starting communication among a plurality of communication terminals, according to an embodiment of the present disclosure.

Figure 1:
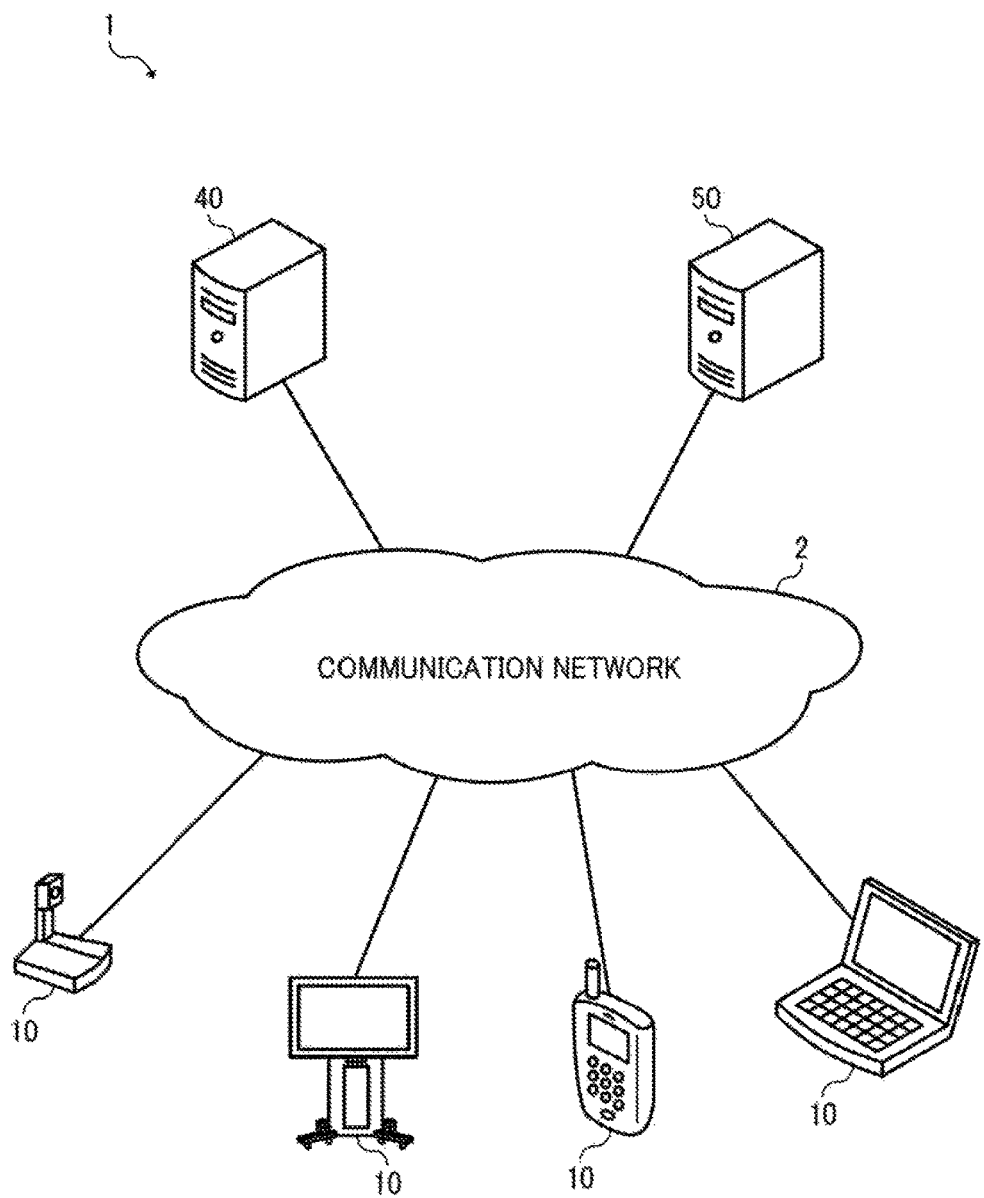
FIG. 1 is a schematic diagram illustrating a configuration of a communication system according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an embodiment of the present invention is described with reference to the drawings.

<<Schematic Configuration of Communication System>>

FIG. 1 is a schematic diagram illustrating a configuration of a communication system according to the present embodiment.

As illustrated in FIG. 1, the communication system 1 includes a communication terminal 10, an authentication server 40, and a management system 50. Hereinafter, the communication terminal 10 may be referred to simply as the terminal 10.

The management system 50 is a server that receives a message publication request and a message subscription request from clients in the publish-subscribe model. Such message publication requests and message subscription requests are used to exchange messages among clients. The publish-subscribe model may be referred to simply as a pub/sub model, and publication and subscription may be referred to simply as pub and sub, respectively. As a protocol compatible with the pub/sub model, for example, the management system 50 may be provided with a pub/sub extension (XEP-0060) of Message Queue Telemetry Transport (MQTT) or Extensible Messaging and Presence Protocol (XMPP).

The communication terminal 10 may be, for example, a general-purpose communication terminal, and may be installed with a desired client application. Alternatively, the communication terminal 10 may be, for example, a communication terminal that is designed for exclusive use, and may be installed with a specific client application that serves as a client. The communication terminal 10 is connected to the management system 50 through a communication network 2. Accordingly, the clients of the communication terminal 10 can request message pub and message sub from the management system 50. The communication terminal 10 may be, for example, a television conference terminal, an electronic whiteboard, digital signage, a telephone, a tablet personal computer (PC), a smartphone, a camera, and a PC.

The authentication server 40 is a server that authenticates a client, which is a client application operating on the communication terminal 10, and a user who uses that client, respectively, to authorize the use of the management system 50. In order to implement such authentication and authorization as above, the management system 50 is provided with an authenticating or authorizing protocol such as OAuth 2.0 or OpenID Connect.

For the purpose of simplification, cases in which each of the management system 50 and the authentication server 40 is a single device are described as above with reference to FIG. 1. However, no limitation is intended by such an embodiment. At least one of the management system 50 and the authentication server 40 may include a plurality of devices. Alternatively, the management system 50 and the authentication server 40 may be implemented by a single system or device.

Moreover, for the purpose of simplification, cases in which the communication system 1 includes the four communication terminals 10 are described as above with reference to FIG. 1. However, no limitation is intended by such an embodiment. The number of the communication terminals 10 that are provided for the communication system 1 may be two, three, or five or more. The types of the communication terminals 10 may be similar to each other, or may be different from each other as illustrated in FIG. 1.

<<Hardware Configuration>>

Next, the hardware configuration of each element of the communication system 1 is described.

Figure 2:
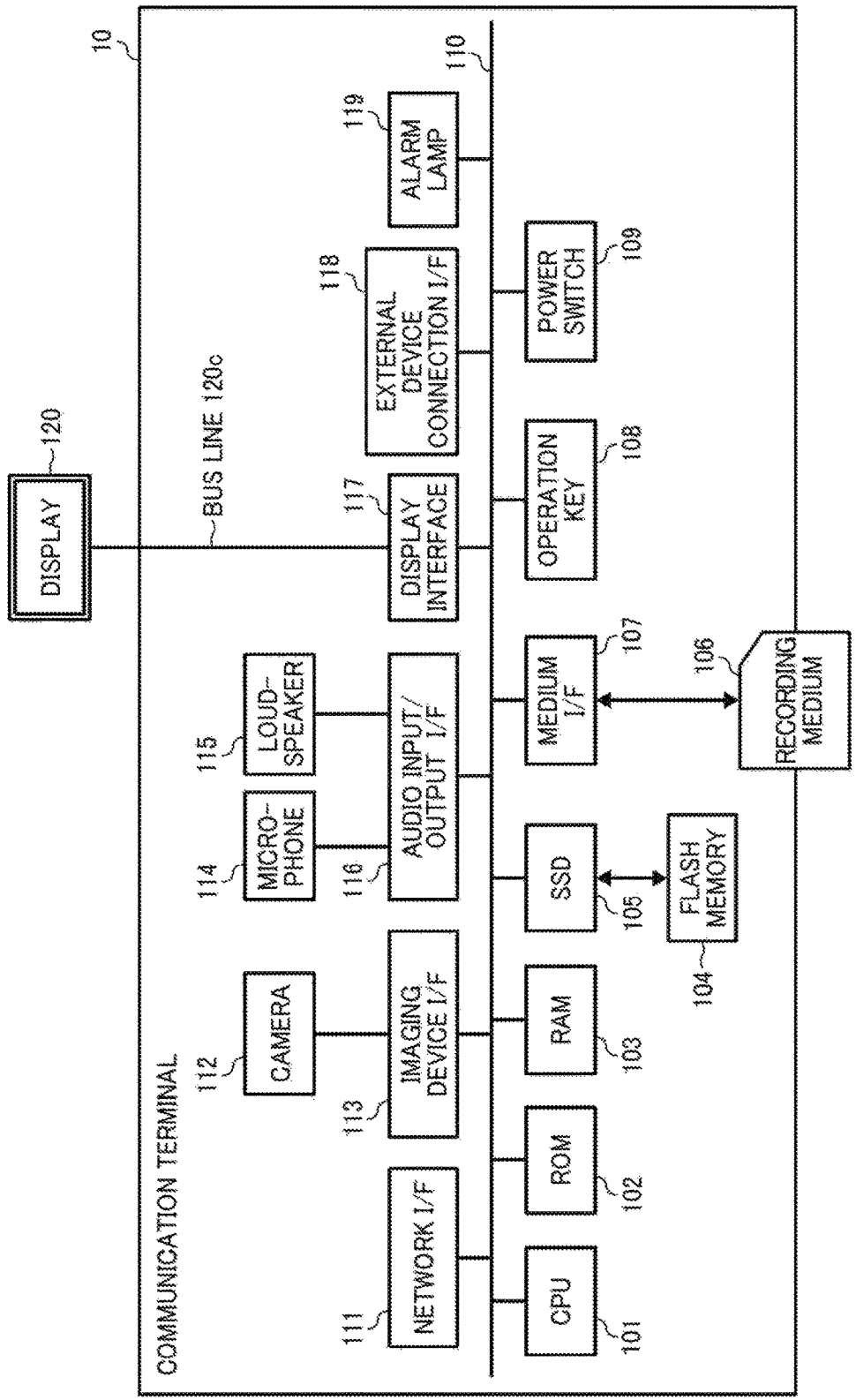
FIG. 2 is a schematic block diagram illustrating a hardware configuration of a communication terminal according to an embodiment of the present disclosure.

FIG. 2 is a schematic block diagram illustrating the hardware configuration of the communication terminal 10 according to the present embodiment.

The hardware configuration of the communication terminal 10 is not limited to the hardware configuration illustrated in FIG. 2 as long as the communication terminal 10 is capable of performing communication. For example, the communication terminal 10 may include an additional element that is not illustrated in FIG. 2. Alternatively, some of the elements illustrated in FIG. 2 may be omitted. Moreover, some of the elements illustrated in FIG. 2 may be, for example, an external device that can be coupled to the communication terminal 10. As illustrated in FIG. 2, the communication terminal 10 according to the present embodiment includes a central processing unit (CPU) 101 that controls the overall operation of the communication terminal 10, a read-only memory (ROM) 102 that stores a control program used for operating the CPU 101 such as an initial program loader (IPL), a random access memory (RAM) 103 is mainly used as a work area in which the CPU 101 executes a program, a flash memory 104 that stores various kinds of data such as a communication control program for the communication terminal 10, image data, and audio data, a solid state disk (SSD) 105 that controls reading or writing of various data to or from the flash memory 104 under control of the CPU 101, a medium interface (I/F) 107 that controls reading or writing of data with respect to a recording medium 106 such as a flash memory and an integrated circuit (IC) card, an operation key 108 that is operated by a user to input a user instruction such as a user selection of a destination of the communication from the communication terminal 10, a power switch 109 that turns on or turns off the power of the communication terminal 10, and a network interface (I/F) 111 that transmits data using the communication network 2.

Moreover, the communication terminal 10 includes a built-in camera 112 that captures a subject under the control of the CPU 101 to obtain the image data of the subject, an imaging device interface (I/F) 113 that controls the operation of the camera 112, a built-in microphone 114 that receives sound, a built-in loudspeaker 115 that outputs sound, an audio input and output (input/output) interface (I/F) 116 that controls the input and output of an audio signal between the microphone 114 and the loudspeaker 115 under the control of the CPU 101, a display interface 117 that transmits the image data to an external display 120 under the control of the CPU 101, an external device connection interface (I/F) 118 that connects the communication terminal 10 to various kinds of external devices, an alarm lamp 119 that provides notification of various kinds of functional abnormalities detected in the communication terminal 10, and a bus line 110 such as an address bus or a data bus that electrically connects various elements as above to each other as illustrated in FIG. 2.

The display 120 is a display formed of liquid crystal or organic electroluminescence (EL) that displays an image of a subject, an operation icon, or the like. The display 120 is connected to the display interface 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

To the external device connection interface 118, an external device such as an external camera, an external microphone, and an external loudspeaker can be electrically connected, through a Universal Serial Bus (USB) cable or the like that is inserted into a connection port of the housing of the communication terminal 10. In cases where an external camera is connected, the external camera is driven on a priority basis and the built-in camera 112 is not driven under the control of the CPU 101. In a similar manner to the above, in the case where an external microphone is connected or an external loudspeaker is connected, the external microphone or the external loudspeaker is driven under the control of the CPU 101 on a top-priority basis over the built-in microphone 114 or the built-in loudspeaker 115.

The recording medium 106 is removable from the communication terminal 10. In addition, a nonvolatile memory that reads or writes data under the control of the CPU 101 is not limited to the flash memory 104, and for example, an electrically erasable and programmable read-only memory (EEPROM) may be used instead.

Figure 3:
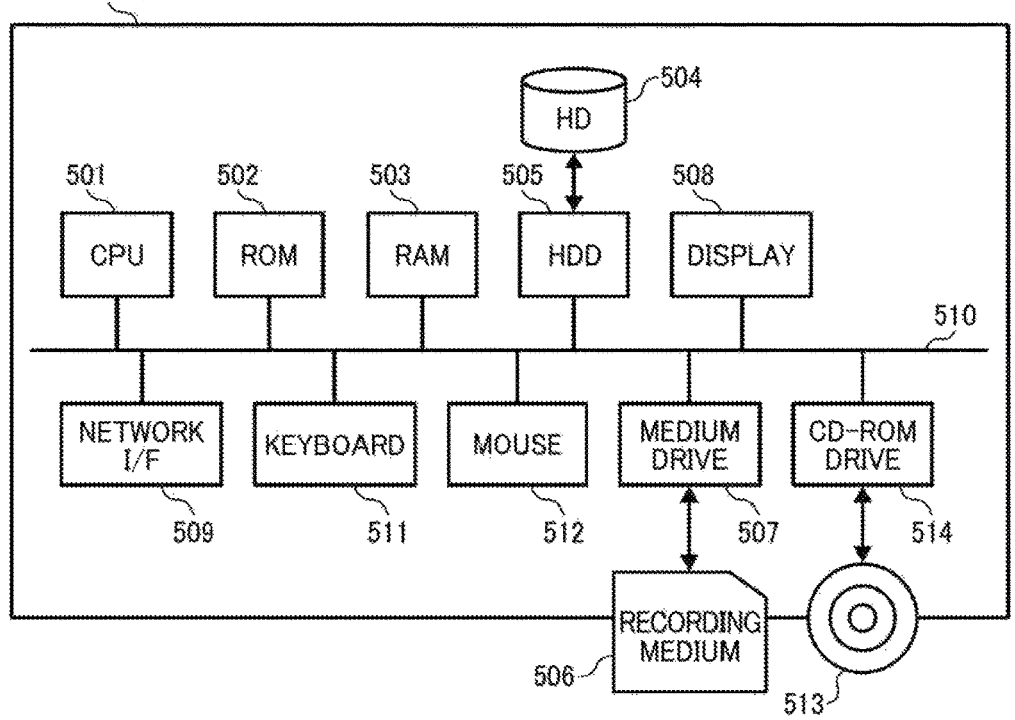
FIG. 3 is a schematic block diagram illustrating a hardware configuration of a management system according to an embodiment of the present disclosure.

FIG. 3 is a schematic block diagram illustrating a hardware configuration of the management system 50 according to the present embodiment.

The management system 50 according to the present embodiment includes a CPU 501 that controls the entire operation of the management system 50, a ROM 502 that stores a control program for controlling the CPU 501 such as the IPL, a RAM 503 that is used as a work area for the CPU 501, a hard disk (HD) 504 that stores various kinds of data such as a control program for the management system 50, a hard disk drive (HDD) 505 that controls reading or writing of various kinds of data to or from the HD 504 under control of the CPU 501, a medium drive 507 that controls reading or writing of data from and to a recording medium 506 such as a flash memory, a display 508 that displays various kinds of information such as a cursor, a menu, a window, a character, and an image, a network interface (I/F) 509 that performs data communication using the communication network 2, a keyboard 511 that is provided with a plurality of keys for allowing a user to input characters, numerical values, or various kinds of instructions, a mouse 512 for selecting or executing various kinds of instructions, selecting an object to be processed, or for moving a cursor, a compact disc read only memory (CD-ROM) drive 514 that reads or writes various kinds of data from and to a CD-ROM 513, which is one example of removable recording medium, and a bus line 510 such as an address bus or a data bus that electrically connects various elements as above to each other as illustrated in FIG. 3.

Note that the hardware configuration of the authentication server 40 illustrated in FIG. 1 is similar to that of the management system 50, and thus the description of the hardware configuration of the authentication server 40 is omitted.

<Software Configuration of Communication Terminal>

Figure 4:
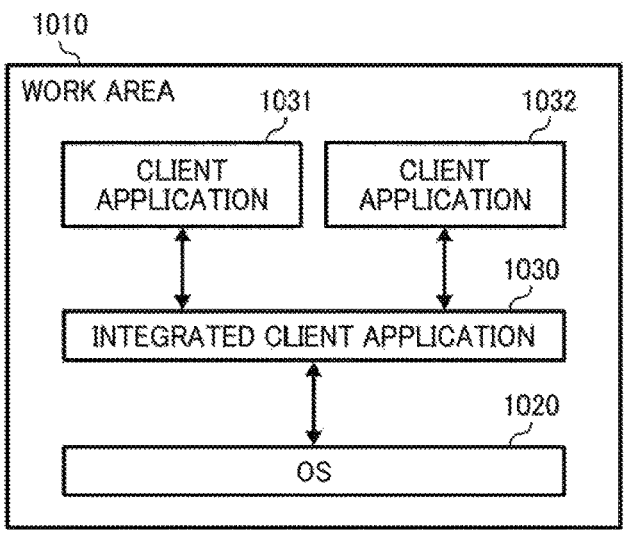
FIG. 4 is a schematic block diagram illustrating a software configuration of a communication terminal according to an embodiment of the present disclosure.

FIG. 4 is a schematic block diagram illustrating a software configuration of the communication terminal 10 according to the present embodiment.

As illustrated in FIG. 4, the communication terminal 10 is installed with an operating system (OS) 1020, an integrated client application 1030, and client applications 1031 and 1032, and these client applications 1030, 1031, and 1032 may be deployed in a work area 1010 of the RAM 103. In FIG. 4, the communication terminal 10 is installed with the OS 1020, the integrated client application 1030, and the client applications 1031 and 1032.

The OS 1020 is basic software that controls the entire operation of the communication terminal 10 through providing basic functions. The integrated client application 1030 request the authentication server 40 to perform authentication, and sends at least one of a pub request and a sub request to the management system 50. The integrated client application 1030 manages a presence that indicates the status of each of the client applications 1031 and 1032 based on the information sent from each of the client applications 1031 and 1032. Accordingly, the integrated client application 1030 requests the management system 50 to publish the presence of each client of the communication terminal 10. The client applications 1031 and 1032 communicate with the corresponding client applications of another communication terminal 10, for example, by exchanging contents of data with each other. In order to establish a session with the corresponding client applications of another communication terminal 10, the client applications 1031 and 1032 send a call control message to the corresponding client applications of another communication terminal 10 through the integrated client application 1030.

In FIG. 4, the communication terminal 10 is installed with at least two client applications (for example, the client applications 1031 and 1032). However, no limitation is indicated thereby, and the communication terminal 10 may be installed with one or any number of client applications.

<Functional Configuration>

Next, the functional configuration according to the present embodiment is described.

Figure 5:
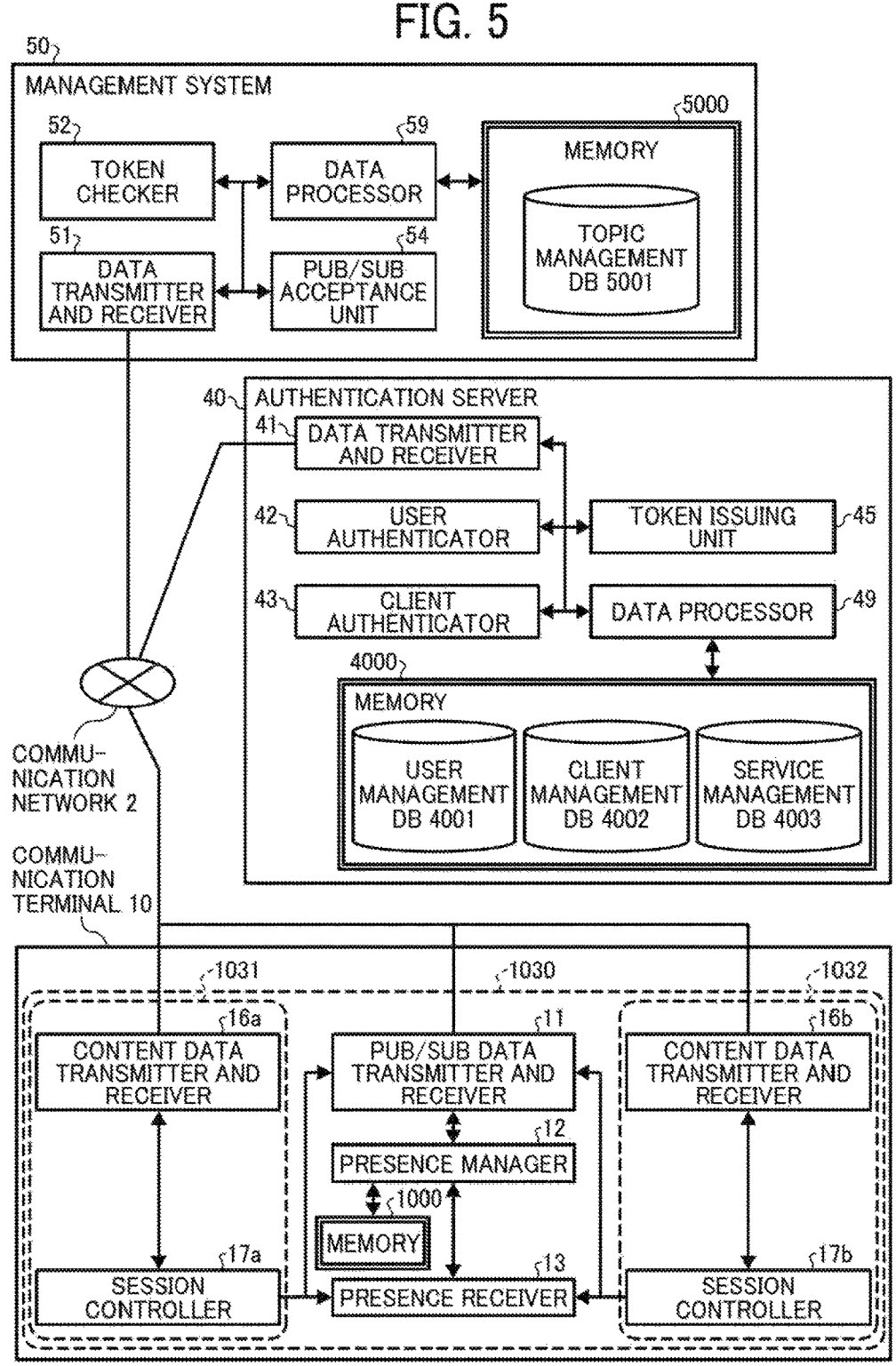
FIG. 5 is a functional block diagram of a communication terminal, an authentication server, and a management system, according to an embodiment of the present disclosure.

FIG. 5 is a functional block diagram of the communication terminal 10, the authentication server 40, and the management system 50, according to an embodiment of the present invention.

Note that the communication terminal 10, the authentication server 40, and the management system 50 together configure a part of the communication system 1. In FIG. 5, the communication terminal 10, the authentication server 40, and the management system 50 are connected with each other so as to perform data communication through the communication network 2.

<Functional Configuration of Communication Terminal>

The communication terminal 10 includes a pub/sub data transmitter and receiver 11, a presence manager 12, a presence receiver 13, a content data transmitter and receiver 16a, a content data transmitter and receiver 16b, and session controllers 17a and 17b. These elements are functions that are implemented by the operation of some of the hardware components illustrated in FIG. 2 executed by the instructions from the CPU 101 in accordance with a control program expanded from the flash memory 104 onto the RAM 103. Note that the pub/sub data transmitter and receiver 11, the presence manager 12, and the presence receiver 13 are implemented as the integrated communication client that serves as an integrated client operates. The content data transmitter and receiver 16a and the session controller 17a are implemented as the video communication application A that serves as the client application 1031 operates. The content data transmitter and receiver 16b and the session controller 17b are implemented as the video communication application B that serves as the client application 1032 operates. Cases in which two client applications operate are described as above, but three or more client applications may operate. When three or more client applications operate, the content data transmitter and receiver and the session controller of each operating client application operate. The communication terminal 10 further includes a memory 1000 configured by the ROM 102, the RAM 103, and the flash memory 104 illustrated in FIG. 2.

<Detailed Functional Configuration of Communication Terminal>

Next, the functional configuration of the communication terminal 10 is described in detail with reference to FIG. 2 and FIG. 5. In the following description of the functional configuration of the communication terminal 10, the relation of the hardware elements in FIG. 2 with the functional configuration of the communication terminal 10 will also be described.

The pub/sub data transmitter and receiver 11 and the content data transmitter and receivers 16a and 16b are implemented by the instructions from the CPU 101 and the network interface 111, each of which is illustrated in FIG. 2, and transmits or receives various kinds of data (or information) to or from a counterpart communication terminal, apparatus, or system, through the communication network 2. The pub/sub data transmitter and receiver 11 sends a pub request and a sub request for messages related to a specific topic to the management system 50 in order to transmit and receive messages related to the topic. The content data transmitter and receiver 16a and the content data transmitter and receiver 16b exchange contents of data with another communication terminal 10.

The presence manager 12 is implemented by the instructions from the CPU 101 illustrated in FIG. 2, and manages the communication status of each client application of the local communication terminal as presence information.

The presence receiver 13 is implemented by the instructions from the CPU 101 illustrated in FIG. 2, and receives presence information sent from the client applications.

The session controllers 17a and 17b are implemented by the instructions from the CPU 101 illustrated in FIG. 2, and control the communication of the client applications 1031 and 1032 based on the call control information exchanged among the communication terminals 10.

The data processor 19, which may be implemented by the instructions of the CPU 101 and the SSD 105, or the instructions of the CPU 101, stores various data in the memory 1000 or reads various data from the memory 1000.

<Functional Configuration of Authentication Server>

As illustrated in FIG. 5, the authentication server 40 includes a data transmitter and receiver 41, a user authenticator 42, a client authenticator 43, a token issuing unit 45, and a data processor 49. These units are functions implemented by or caused to function by operating some of the elements illustrated in FIG. 3 under the control of the instructions from the CPU 501. Note also that such instructions from the CPU 501 are made in accordance with a program for the authentication server 40 expanded from the HD 504 to the RAM 503. The authentication server 40 also includes a memory 4000) that is configured by the HD 504 illustrated in FIG. 3.

<User Management Table>

FIG. 6A is a diagram illustrating an example data structure of a user management table, according to the present embodiment.

In the memory 4000, as illustrated in FIG. 5, a user management database (DB) 4001 that is made of a user management table is stored. In the authentication management table, for each user ID (identifier, identification), the user name and the password are stored in association with each other.

<Client Management Table>

FIG. 6B is a diagram illustrating an example data structure of a client management table, according to the present embodiment.

In the memory 400), as illustrated in FIG. 5, a client management database (DB) 4002 that is made of a client management table is stored. In the authentication management table, for each client ID, the client name and the password are stored in association with each other.

<Service Management Table>

FIG. 6C is a diagram illustrating an example data structure of a service management table, according to the present embodiment.

In the memory 4000, as illustrated in FIG. 5, a service management database (DB) 4003 that is made of a service management table is stored. The service management table stores the service name in association with each service ID. According to the present embodiment, the service "transmission management system" that is identified by service ID "S01" is the management system 50. The right of the management system 50 to use the functions of pub/sub is the resource. Note also that the pub/sub service with the use of the management system 50 serves as a scope of authorization in the protocol of OAuth 2.0. Note also that the management system 50 serves as a resource server.

<Detailed Functional Configuration of Authentication Server>

The data transmitter and receiver 41 is implemented by the instructions from the CPU 501 and the network interface 509, each of which is illustrated in FIG. 3, and transmits or receives various kinds of data (or information) to or from a counterpart communication terminal, apparatus, or system, through the communication network 2.

The user authenticator 42 is implemented by the instructions from the CPU 501 illustrated in FIG. 3, and performs user authentication in response to a request from a client.

The client authenticator 43 is implemented by the instructions from the CPU 501 illustrated in FIG. 3, and performs client authentication in response to a request from a client.

The token issuing unit 45 is implemented by the instructions from the CPU 501 illustrated in FIG. 3, and issues an authorizing token to be used in the service that a client wishes to access.

The data processor 49 is substantially implemented by the instructions from the CPU 501 and the HDD 505, each of which is illustrated in FIG. 3. The data processor 49 stores various types of data in the memory 4000 or read various types of data from the memory 4000. Note that the data processor 49 may be implemented by the instructions from the CPU 501 only.

<Functional Configuration of Management System>

The management system 50 includes a data transmitter and receiver 51, a token checker 52, a pub/sub acceptance unit 54, and a data processor 59. These units are functions implemented by or caused to function by operating some of the elements illustrated in FIG. 3 under the control of the instructions from the CPU 501. Note also that such instructions from the CPU 501 are made in accordance with a program for the management system 50 expanded from the HD 504 to the RAM 503. The management system 50 also includes a memory 5000 that is configured by the HD 504 illustrated in FIG. 3.

<Topic Management Table>

FIG. 6D is a diagram depicting a topic management table according to the present embodiment.

In the memory 5000, a topic management database (DB) 5001 that is made of a topic management table is stored. The topic management table stores the client ID and the user ID in association with each topic name. A topic is an attribute associated with a message. Once a client application specifies a topic name and sends a pub request, the management system 50 sends a message to the client application that is specified by the client ID and the user ID that are associated with the specified topic name in the topic management table.

<Detailed Functional Configuration of Management System>

Next, the functional configuration of the management system 50 is described in detail. In the following description of the functional configuration of the management system 50, the relation between the hardware configuration of FIG. 3 and the functional configuration of the management system 50 illustrated in FIG. 5 will also be described.

The data transmitter and receiver 51 is implemented by the instructions from the CPU 501 and the network interface 509, each of which is illustrated in FIG. 3, and transmits or receives various kinds of data (or information) to or from another communication terminal, apparatus, or system, through the communication network 2.

The token checker 52 is implemented by the instructions from the CPU 501 illustrated in FIG. 3, and checks an authorizing token included in the login request sent from the communication terminal 10.

The pub/sub acceptance unit 54 is implemented by the instructions from the CPU 501 illustrated in FIG. 3, and receives a pub request and a sub request from the client.

The data processor 59 is implemented by a command from the CPU 501 and by the HDD 505, or by a command from the CPU 501, and performs processing to store various types of data in the memory 5000 or to read various types of data stored in the memory 5000.

<Functional Configuration of Other Devices>

The communication terminal 10 may send contents of data to another communication terminal 10 through a relay device. In such cases, the communication system 1 is provided with, for example, a relay device and a relay device management server. Note that the hardware configuration of the relay device management server 20 and the relay device 30 is similar to that of the communication management system 50 illustrated in FIG. 3, and thus the description of the hardware configuration of the relay device management server 20 and the relay device 30 is omitted. The relay device 30 establishes a session with the client applications of multiple communication terminals 10, and relays the contents of data that are sent from the client application of one communication terminal 10 to the client application of another communication terminal 10 through the communication network 2. The relay device management server 20 manages the relay of the contents of data that is performed by the relay device 30. Note that a plurality of relay device management servers 20 and a plurality of relay devices 30 may be provided in the above configuration.

<Functional Configuration of Relay Device Management Server>

Figure 7:
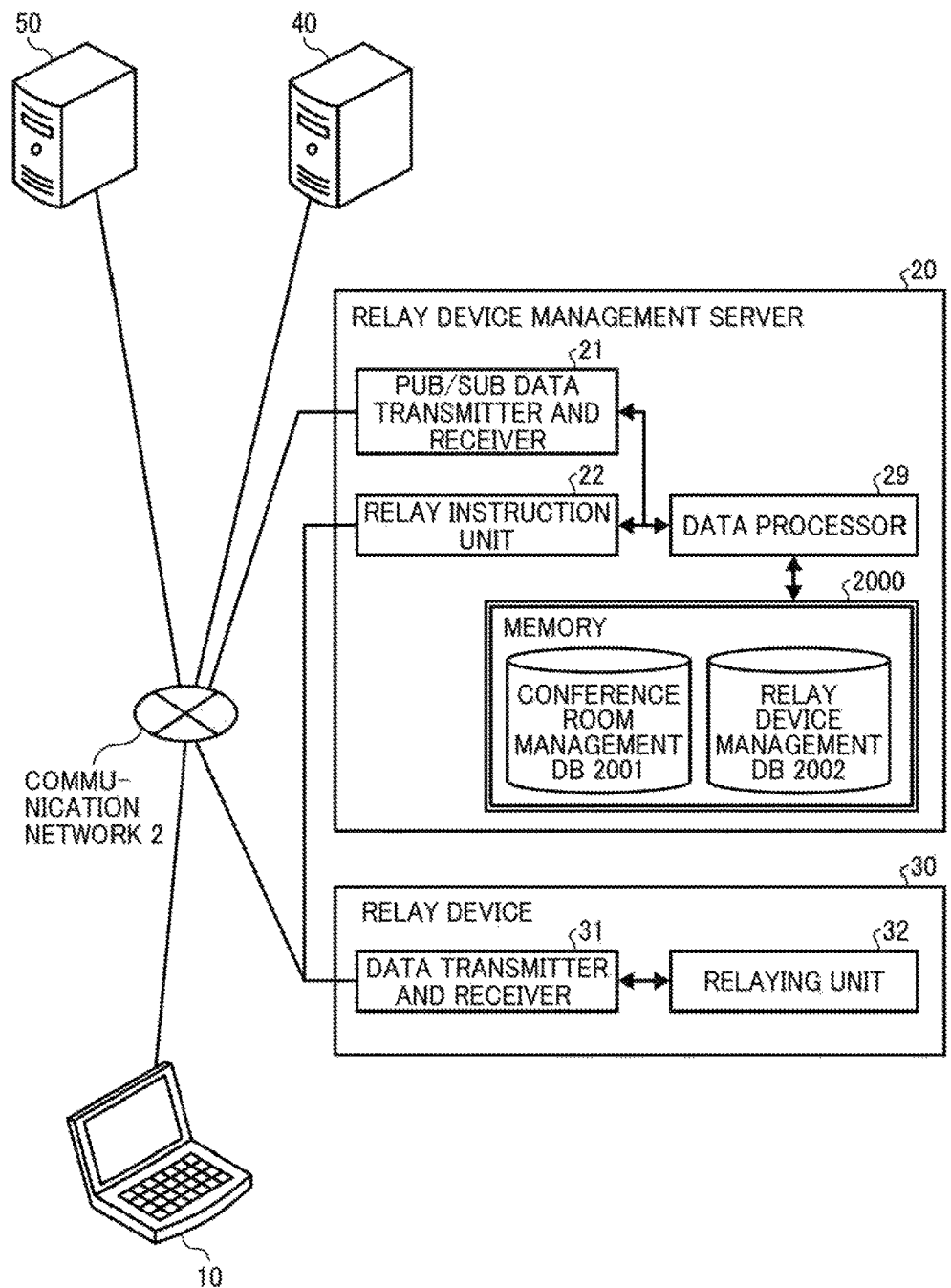
FIG. 7 is a functional block diagram of a relay device management server and a relay device, according to an embodiment of the present disclosure.

FIG. 7 is a functional block diagram of the relay device management server 20 and the relay device 30, according to the present embodiment.

The relay device management server 20 includes a pub/sub data transmitter and receiver 21, a relay instruction unit 22, and a data processor 29. These units are functions implemented by or caused to function by operating some of the elements illustrated in FIG. 3 under the control of the instructions from the CPU 501. Note also that such instructions from the CPU 501 are made in accordance with a program for the relay device management server 20 expanded from the HD 504 to the RAM 503. The relay device management server 20 also includes a memory 2000 that is configured by the HD 504 illustrated in FIG. 3.

<Conference Room Management Table>

FIG. 8A is a diagram illustrating an example data structure of a conference room management table, according to the present embodiment.

In the memory 2000, as illustrated in FIG. 7, a conference room management database (DB) 2001 that is made of a conference room management table is stored. In the conference room management table, conference room ID is associated with a topic name. The topic name indicates the name of a topic indicating a call control message in a session "sed" where contents of data are exchanged between a pair of communication terminals 10. Note also that the conference room ID is identification information that is given to each session "sed" for a video conference among multiple communication terminals 10. The conference room ID may be replaced with, for example, conference ID and session ID.

<Relay Device Management Table>

FIG. 8B is a diagram illustrating an example data structure of a relay device management table, according to the present embodiment.

In the memory 2000, as illustrated in FIG. 7, a relay device management database (DB) 2002 that is made of a relay device management table is stored. In the topic management table, user ID and client ID of each communication terminal 10 that uses the relay device 30 are associated with each other.

<Functional Configuration of Relay Device Management Server>

Next, the functional configuration of the relay device management server is described in detail. In the following description of the functional configuration of relay device management server 20, the relation of the hardware elements in FIG. 3 with the functional configuration of relay device management server 20 in FIG. 7 will also be described.

The pub/sub data transmitter and receiver 21 is implemented by the instructions from the CPU 501 and the network interface 509, each of which is illustrated in FIG. 3, and transmits or receives various kinds of data (or information) to or from another communication terminal, apparatus, or system, through the communication network 2.

The relay instruction unit 22 is implemented by the instructions from the CPU 501 illustrated in FIG. 3, and instructs the relay device 30 to relay the contents of data among the multiple communication terminals 10.

The data processor 29 is substantially implemented by the instructions from the CPU 501 and the HDD 505, each of which is illustrated in FIG. 3. The data processor 29 stores various types of data in the memory 2000 or read various types of data from the memory 2000. Note that the data processor 29 may be implemented by the instructions from the CPU 501 only.

<Functional Configuration of Relay Device>

The relay device 30 includes a data transmitter and receiver 31 and a relaying unit 32. These units are functions implemented by or caused to function by operating some of the elements illustrated in FIG. 3 under the control of the instructions from the CPU 501. Note also that such instructions from the CPU 501 are made in accordance with a program for the relay device 30 expanded from the HD 504 to the RAM 503.

Next, the functional configuration of the relay device 30 is described in detail. In the following description of the functional configuration of the relay device 30, the relation of the hardware elements in FIG. 3 with the functional configuration of the relay device 30 in FIG. 8 will also be described.

The data transmitter and receiver 31 is implemented by the instructions from the CPU 501 and the network interface 509, each of which is illustrated in FIG. 3, and transmits or receives various kinds of data (or information) to or from another communication terminal, apparatus, or system, through the communication network 2.

The relaying unit 32 is implemented by the instructions from the CPU 501 illustrated in FIG. 3, and relays the contents of data among the multiple communication terminals 10.

<Operation>

Next, the operation of the communication terminal 10, the authentication server 40, and the management system 50 that together configure the communication system 1 is described. Firstly, the authentication processes according to the present embodiment are described with reference to FIG. 9.

FIG. 9 is a sequence diagram illustrating the authentication processes according to the present embodiment.

Once a desired client application that is installed in the communication terminal 10 is activated (step S21), the functional units that correspond to the activated client application start the following processes. The client application of the communication terminal 10 obtains user ID and a user password (step S22). No limitation is intended, but the obtaining method may be, for example, a method in which the communication terminal 10 accepts an input of user ID and a password, and a method in which the data processor 19 reads user ID and a password that are stored in advance in the memory 1000.

The pub/sub data transmitter and receiver 11 of the communication terminal 10 requests the authentication server 40 to perform authentication (step S23). The authentication request includes a request to authenticate a user and a request to authenticate a client. The authentication request that is sent to the management system 50 includes the user ID and the user password obtained by the communication terminal 10, client ID and a client password of the activated client application, and service ID that serves as a scope indicating the service to be used. The client ID and the client password may be stored in advance in the memory 1000 and be read by the data processor 19. In the following description, cases in which the service ID included in the authentication request is "S01" that indicates the management system 50 are described.

The data transmitter and receiver 41 of the authentication server 40 receives an authentication request sent from the communication terminal 10. The user authenticator 42 of the authentication server 40 authenticates a user depending on whether or not a pair of the user ID and the user password included in the authentication request is stored in the user management table (see FIG. 6A) (step S24). When a pair of the user ID and the user password included in the authentication request is stored in the user management table, the user authenticator 42 successfully authenticates the user. When a pair of the user ID and the user password included in the authentication request is not stored in the user management table, the user authenticator 42 fails to authenticate the user.

The client authenticator 43 of the authentication server 40 authenticates a client depending on whether or not a pair of the client ID and the client password included in the authentication request is stored in the client management table (see FIG. 6B) (step S25). When a pair of the client ID and the client password included in the authentication request is stored in the client management table, the client authenticator 43 successfully authenticates the client. When a pair of the client ID and the client password included in the authentication request is not stored in the client management table, the client authenticator 43 fails to authenticate the client.

When there is a failure in at least one of the user authentication and the client authentication, the data transmitter and receiver 41 sends an error message indicating a failure in authentication or authorization to the request sender communication terminal 10.

When the user authentication and the client authentication are successful, the token issuing unit 45 of the authentication server 40 issues an authorizing token that indicates that the request sender communication terminal 10 can access the management system 50 (step S27). The authorizing token includes the user name, the client name, the service name that uses this authorizing token, the expiration date, or the like.

In the communication system 1, authentication and authorization can be performed with a protocol such as the OAuth 2.0 and the OpenID Connect. In such cases, a method of exchanging the authentication information such as user ID and a user password and the contents of the authorizing token are determined by the specification of a protocol such as the OAuth 2.0 and the OpenID Connect. In this configuration, the token may be a JSON Web Token (JWT). In order to ensure that the authorizing token is not tampered with in the path, the token issuing unit 45 may digitally sign the authorizing token using a secret key. The secret key may be implemented using the RSA (Rivest, Shamir, and Adleman) cryptosystem. Note also that the digital signature may be implemented using a public key cryptography such as the hash-based message authentication code (HMAC). The management system 50 that uses the authorizing token checks the digital signature using a public key or a secret key depending on whether the authorizing token is digitally signed using a secret key or a public key. The digital signature may be implemented using a known standard, for example, the JSON Web Signature (JWS). The authorizing token may be encoded by using, for example, the JSON Web Encryption (JWE), where appropriate.

The data transmitter and receiver 41 incorporates the issued authorizing token into the authentication result, and sends the authentication result to the communication terminal 10. The pub/sub data transmitter and receiver 11 of the communication terminal 10 receives from the authentication server the authentication result that includes the authorizing token. Subsequently, the pub/sub data transmitter and receiver 11 of the communication terminal 10 sends the received authorizing token to the management system 50 to request login (step S28).

The data transmitter and receiver 51 of the communication management system 50 receives the login request sent from the communication terminal 10. The token checker 52 of the management system 50 checks an authorizing token included in the login request (step S29). In this case, the token checker 52 analyzes the authorizing token that is included in the login request according to the standard adopted in the communication system 1. The token checker 52 may determine whether the digital signature that is made by the authentication server is appropriate based on the result of the analysis. When the digital signature that is made by the authentication server is determined to be inappropriate, the token checker 52 determines that the authorizing token included in the login request has been tampered, and fails to authorize the login request.

Subsequently, the token checker 52 checks the expiration date included in the authorizing token to determine whether or not the expiration date of the authorizing token has expired. When the expiration date of the authorizing token is determined to have expired, the token checker 52 fails to authorize the login request due to the expiration of the authorizing token.

Subsequently, the token checker 52 checks whether or not the authorizing token includes the service name that corresponds to the management system 50. When the authorizing token is determined not to include the service name that corresponds to the management system 50, the token checker 52 fails to authorize the login request.

When the token checker 52 fails to authorize the login request due to the check processes of any one of the digital signature, expiration date, and the service name of the authorizing token, the data transmitter and receiver 51 sends to the communication terminal 10 authorization result information indicating that the authorization ended in failure. When the token checker 52 determines that the digital signature, expiration date, and the service name of the authorizing token are all valid, the use of the service by the user and the client specified in the authorizing token is authorized. Once the user and the client are authorized, the management system 50 establishes a session with the communication terminal 10 (step S30). In such cases, the management system 50 sends to the communication terminal 10 authorization result information indicating that the authorization was successful.

Once the session is established, the management system 50 stores in the memory 1000 the user name of the client, the client name, the IP address of the client, or the like included in the authorizing token in association with each other. Due to this configuration, the management system 50 can figure out the user name of the client (of the request sender) and the client name, without the client's sending the user name and the client name to the management system 50 every time the client sends data to the management system 50.

The processes in the steps S21 to S30 as above are performed for each of the client applications activated in the communication terminal 10. For example, the video communication application A, the video communication application B, and the integrated communication client may use a shared user password or user ID to send an authentication request to the authentication server 40. When the management system 50 has successfully authenticated the client applications, a plurality of sessions are simultaneously established between the management system 50 and the client applications, respectively.

Next, the processes in which the client application 1031 starts communication among the multiple communication terminals 10 are described with reference to FIG. 10 and FIG. 11.

Figure 10:
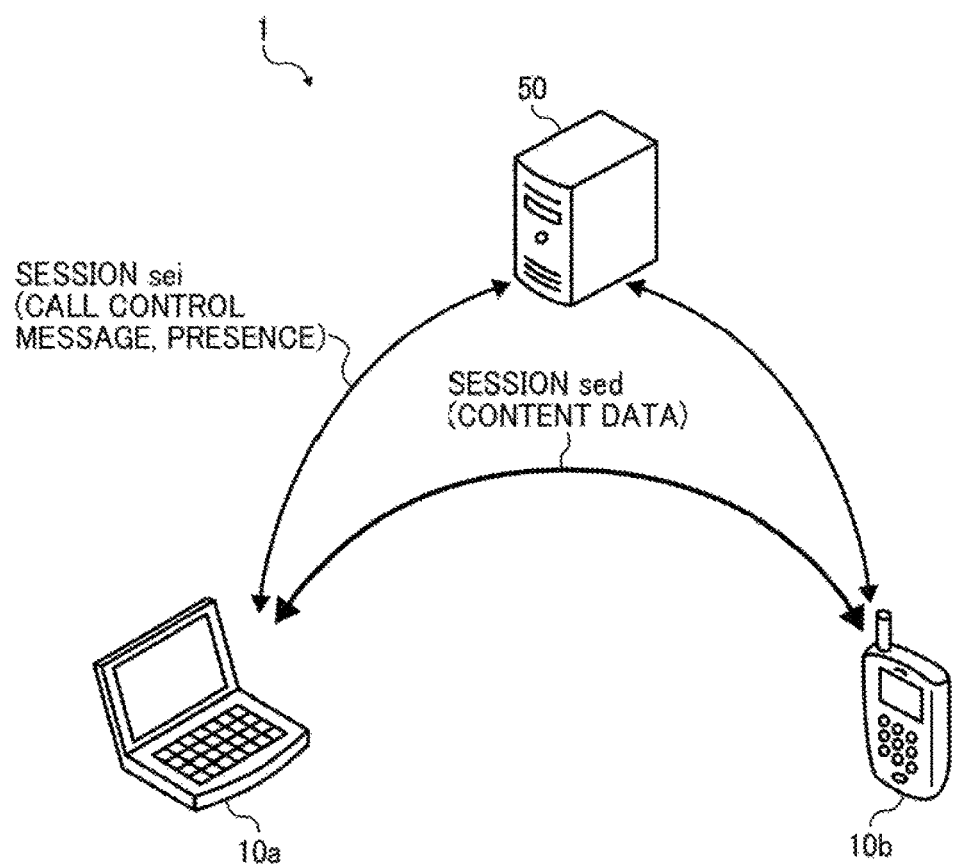
FIG. 10 is a diagram illustrating communication status among a plurality of communication terminals, according to an embodiment of the present disclosure.

FIG. 10 is a diagram illustrating the communication status between the communication terminals 10a and 10b, according to the present embodiment.

Figure 11:
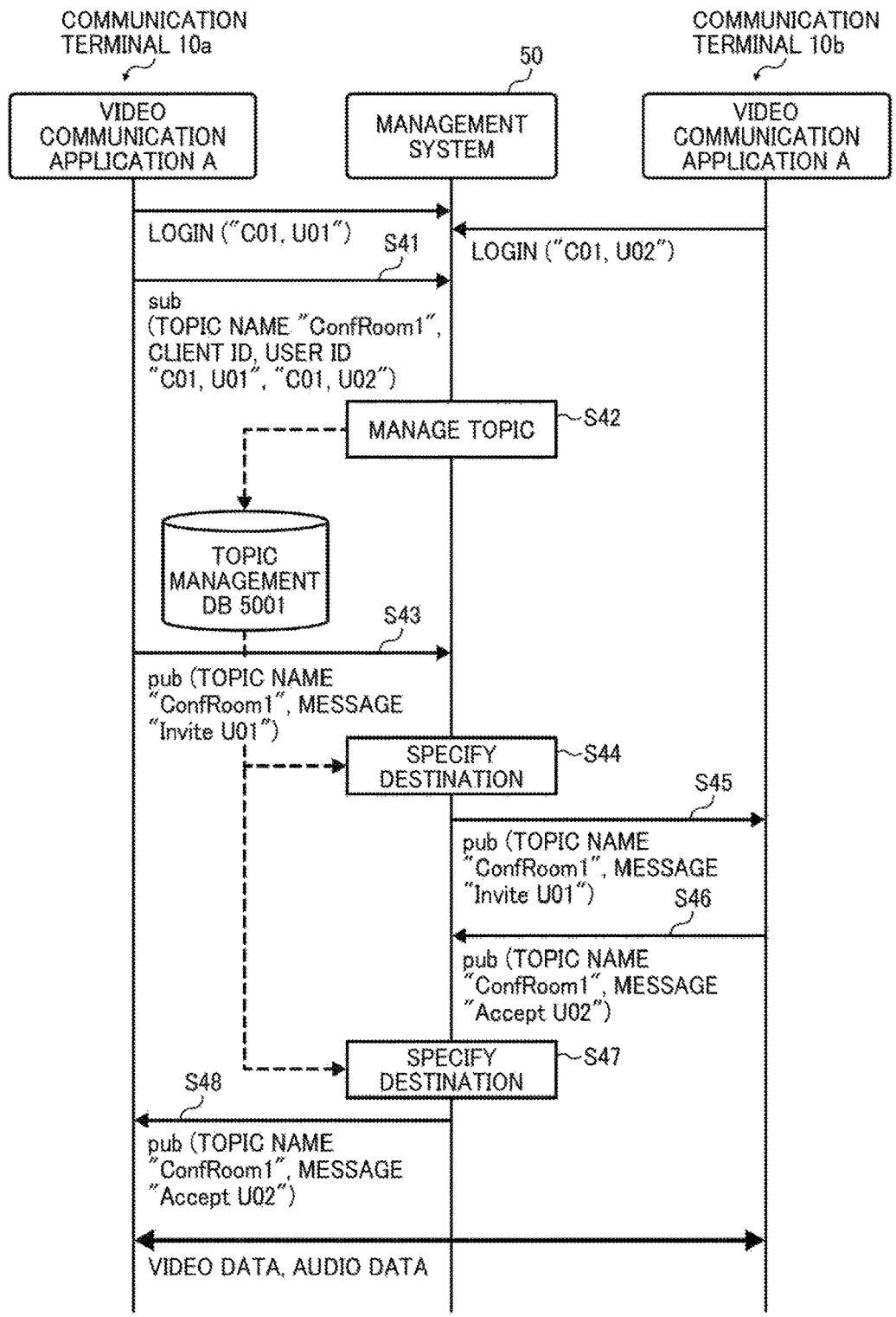
FIG. 11 is a sequence diagram illustrating the processes of starting communication among a plurality of communication terminals, according to an embodiment of the present disclosure.

FIG. 11 is a sequence diagram illustrating the processes of starting communication among a plurality of communication terminals, according to the present embodiment.

Hereinafter, the processes in which a message is published and subscribed to between the video communication application A of the communication terminal 10a that the user "a" uses and the video communication application A of the communication terminal 10b that the user "b" uses, which are examples of the multiple communication terminals 10, are described. In the following description, the user ID of the user "a", the user ID of the user "b", and the client ID of the video communication application A are referred to as "U01", "U02", and "C01", respectively.

In a similar manner to the processes in the steps S21 to S30 as described above, the client application "video communication application A" of the communication terminal 10a uses the user ID "U01" and the client ID "C01" to log into the management system 50 through the pub/sub data transmitter and receiver 11. In a similar manner to the processes in the steps S21 to S30 as described above, the client application "video communication application A" of the communication terminal 10b uses the user ID "U02" and the client ID "C01" to log into the management system 50 through the pub/sub data transmitter and receiver 11. Accordingly, a session "sei" for exchanging a message using a publish-subscribe pattern is established between the communication terminals 10a and 10b and the management system 50.

The session controller 17a of the communication terminal 10a, which is implemented by the video communication application A, sends a sub request to the management system 50 through the pub/sub data transmitter and receiver 11 in order for the video communication applications A of the communication terminals 10a and 10b to receive a message that is associated with the topic name "ConfRoom1" (step S41). The sub request in the step S41 includes the user ID "U01" and the client ID "C01" on the communication terminal 10a side, the user ID "U02" and the client ID "C01" on the communication terminal 10b side, and the topic name "ConfRoom1". The topic that is identified by the topic name "ConfRoom1" includes a call control message for the video communication applications A of the communication terminals 10a and 10b.

The data transmitter and receiver 51 of the communication management system 50 receives the sub request sent by the video communication application A of the communication terminal 10a. The pub/sub acceptance unit 54 of the management system 50 register the topic name, the user ID, and the client ID, which are included in the received sub request, in association with each other in the topic management table (step S42). Accordingly, each of the video communication application A of the communication terminal 10a and the video communication application A of the communication terminal 10b can receive a message that is associated with the topic name "ConfRoom1".

Next, processes after a request to start a phone conversation between the user "a" and the user "b" is accepted in the communication terminal 10a are described. The session controller 17a of the communication terminal 10a requests the management system 50 to publish a message "InviteU01" with the topic name "ConfRoom1" through the pub/sub data transmitter and receiver 11 (step S43). Note that the message "InviteU01" indicates that the video communication application A that the user "a" uses requests to start video communication.

The data transmitter and receiver 51 of the communication management system 50 receives the above pub request. Subsequently, the pub/sub acceptance unit 54 uses the topic name "ConfRoom1", which is included in the received pub request, as a search key to searches the topic management table (see FIG. 6D). Then, the pub/sub acceptance unit 54 extracts the pair "C01, U02" of the associated client ID and user ID, and specifies a destination to which a message is to be sent (step S44). In so doing, the pub/sub acceptance unit 54 specifies, as a destination, the video communication application A of the communication terminal 10b that has used the pair "C01, U02" of the client ID and the user ID to log into the management system 50.

The pub/sub acceptance unit 54 of the management system 50 sends the message and the topic name, which are sent from the video communication application A of the communication terminal 10a, to the video communication application A of the communication terminal 10b, based on the result of the above specifying process (step S45). The session controller 17a of the communication terminal 10b, which is implemented by the video communication application A, receives the message sent from the management system 50 through the pub/sub data transmitter and receiver 11.

Next, processes after a request to start a phone conversation between the user "a" and the user "b" is accepted in the communication terminal 10a are described. The session controller 17a of the communication terminal 10b requests the management system 50 to publish a message "AcceptU02" with the topic name "ConfRoom1" through the pub/sub data transmitter and receiver 11 (step S46). Note that the message "AcceptU02" indicates that the video communication application A that the user "b" uses accepts to start video communication.

The data transmitter and receiver 51 of the communication management system 50 receives the pub request for messages associated with the above topic name "ConfRoom1" Then, in a similar manner to the step S44, the pub/sub acceptance unit 54 specifies, as a destination of messages, the video communication application A of the communication terminal 10a that has used the pair "C01, U01" of the client ID and the user ID to log into the management system 50 (step S47).

The pub/sub acceptance unit 54 of the management system 50 sends the message and the topic name, which are sent from the video communication application A of the communication terminal 10b, to the video communication application A of the communication terminal 10a, based on the result of the above specifying process (step S48). The session controller 17b of the communication terminal 10a receives the message sent from the management system 50 through the pub/sub data transmitter and receiver 11.

Subsequently, the content data transmitter and receiver 16a of the communication terminal 10a, which is implemented by the video communication application A, calls the communication terminal 10b. No limitation is intended, but for example, when the user ID is associated with contact information that identifies the device, such as a telephone number or an IP address, the content data transmitter and receiver 16b may call the destination that is associated with the user ID "U02". When the content data transmitter and receiver 16a of the communication terminal 10b, which is implemented by the video communication application A, receives the call, the session "sed" is established between the video communication application A of the communication terminal 10a and the video communication application A of the communication terminal 10b. Accordingly, through the established session "sed", contents of data such as image data, video data, and audio data may be exchanged between the video communication application A of the communication terminal 10a and the video communication application A of the communication terminal 10b.

Next, the processes in which the client application 1032 starts communication among the multiple communication terminals 10 are described with reference to FIG. 12, FIG. 13A, and FIG. 13B.

Figure 12:
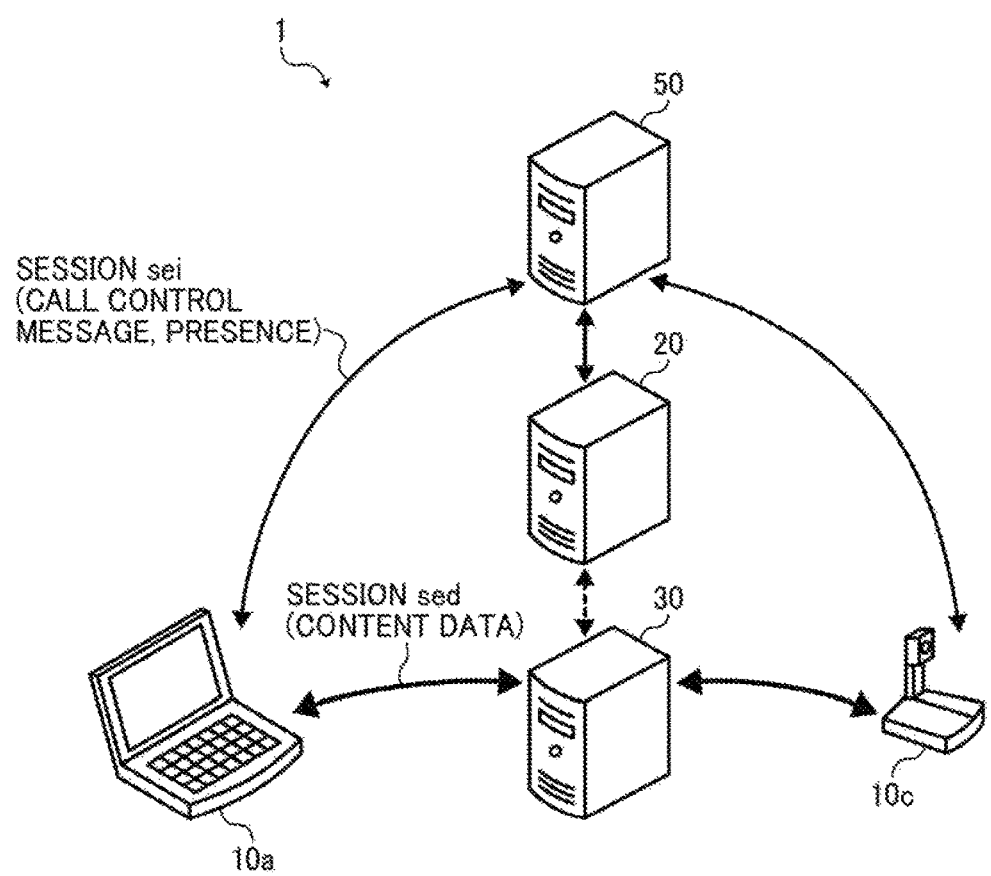
FIG. 12 is a diagram illustrating communication status among a plurality of communication terminals, according to an embodiment of the present disclosure.

FIG. 12 is a diagram illustrating the communication status between the communication terminals 10a and 10c, according to the present embodiment.

Figure 13B:
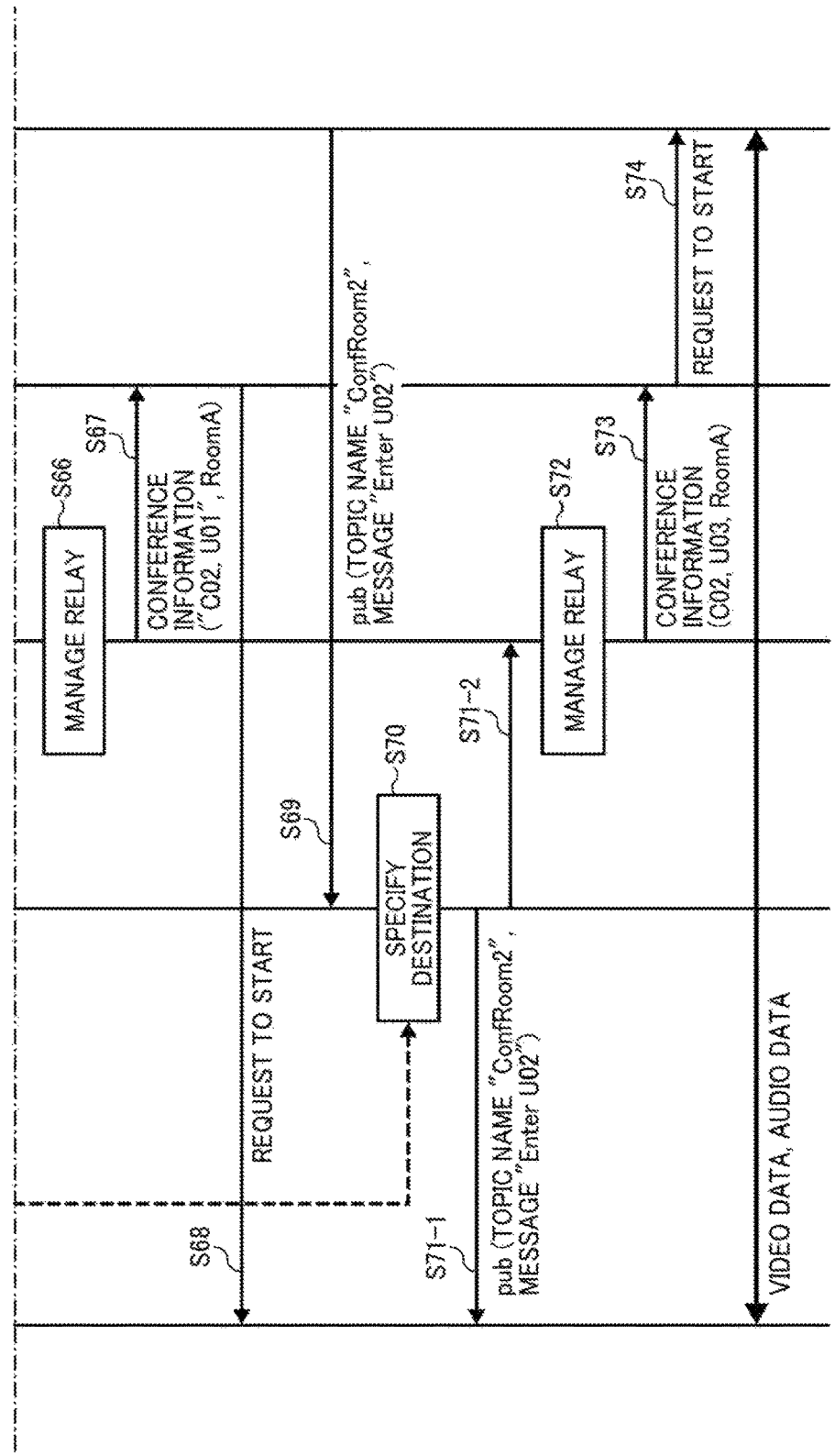

FIG. 13A and FIG. 13B are a sequence diagram illustrating the processes of starting communication between the communication terminals 10a and 10c, according to the present embodiment.

Hereinafter, the processes in which the communication starts between the video communication application B of the communication terminal 10a that the user "a" uses and the video communication application B of the communication terminal 10b that the user "b" uses, which are examples of the multiple communication terminals 10, are described. In the following description, the user ID of the user "a", the user ID of the user "c", and the client ID of the video communication application B are referred to as "U01", "U03", and "C02", respectively. Moreover, the user ID of the user of the relay device management application is referred to as "U04", and the client ID of the relay device management application is referred to as "C03".

In a similar manner to the processes in the steps S21 to S30 as described above, the client application "video communication application B" of the communication terminal 10a uses the user ID "U01" and the client ID "C02" to log into the management system 50 through the pub/sub data transmitter and receiver 11. In a similar manner to the processes in the steps S21 to S30 as described above, the client application "video communication application B" of the communication terminal 10c uses the user ID "U03" and the client ID "C02" to log into the management system 50 through the pub/sub data transmitter and receiver 11. In a similar manner to the processes in the steps S21 to S30 as described above, the client application "relay device management application" of the relay device management server 20 uses the user ID "U04" and the client ID "C03" to log into the management system 50 through the pub/sub data transmitter and receiver 21. Accordingly, a session "sei" for exchanging a message using a publish-subscribe pattern is established among the communication terminals 10a and 10c, the relay device management server 20, and the management system 50. Note that the communication terminal 10a is connected to the management system 50 by establishing a session that is different from the session that is used by the video communication application A to log into the management system 50 using the user ID "U01" and the client ID "C01".

The session controller 17b of the communication terminal 10a, which is implemented by the video communication application B, sends a sub request to the management system 50 through the pub/sub data transmitter and receiver 11 in order for the video communication applications B of the communication terminals 10a and 10c and the relay device management application of the relay device management server 20 to receive a message that is associated to the topic name "ConfRoom2" (step S61). The sub request in the step S61 includes the user ID "U01" and the client ID "C02" on the communication terminal 10a side, the user ID "U03" and the client ID "C02 on the communication terminal 10c side, the user ID "U04" and the client ID "C03" on the relay device management server 20 side, and the topic name "ConfRoom2". The topic that is identified by the topic name "ConfRoom2" includes a call control message for the video communication applications B of the communication terminals 10a and 10c.

The data transmitter and receiver 51 of the communication management system 50 receives the sub request sent by the video communication application B of the communication terminal 10a. The pub/sub acceptance unit 54 of the management system 50 registers the topic name, the user ID, and the client ID, which are included in the received sub request, in association with each other in the topic management table (step S43). Accordingly, each of the video communication application B of the communication terminal 10a, the video communication application A of the communication terminal 10c, and the relay device management application of the relay device management server 20 can receive a message that is associated with the topic name "ConfRoom2".

Next, processes after a request to start a phone conversation between the user "a" and the user "c" is accepted in the communication terminal 10a are described. The session controller 17b of the communication terminal 10a requests the management system 50 to publish a message "Enter/InviteU01" with the topic name "ConfRoom2" through the pub/sub data transmitter and receiver 11 (step S63). Note that the message "Enter/InviteU01" indicates that the video communication application B that the user "a" uses requests to start video communication and enters a virtual conference room.

The data transmitter and receiver 51 of the communication management system 50 receives the above pub request. Subsequently, the pub/sub acceptance unit 54 uses the topic name "ConfRoom2", which is included in the received pub request, as a search key to searches the topic management table (see FIG. 6D). Then, the pub/sub acceptance unit 54 extracts the pairs "C02, U03" and "C03, U04" of the associated client ID and user ID, and specifies a destination to which a message is to be sent (step S64). In so doing, the pub/sub acceptance unit 54 specifies, as a destination, the video communication application B of the communication terminal 10c that has used the pair "C02, U03" of the client ID and the user ID to log into the management system 50. In a similar manner, the pub/sub acceptance unit 54 specifies, as a destination, the relay device management application of the relay device management server 20 that has used the pair "C03, U04" of the client ID and the user ID to log into the management system 50 (step S64).

The pub/sub acceptance unit 54 of the management system 50 sends the message and the topic name, which are sent from the video communication application B of the communication terminal 10a, to the video communication application B of the communication terminal 10c and the relay device management application of the relay device management server 20, based on the result of the above specifying process (step S65-1, step S65-2). The session controller 17b of the communication terminal 10c, which is implemented by the video communication application B, receives the message sent from the management system 50 through the pub/sub data transmitter and receiver 11. In a similar manner, the pub/sub data transmitter and receiver 21 of the relay device management server 20 receives the message sent from the management system 50.

The relay instruction unit 22 of the relay device management server 20 refers to the field of topic name in the conference room management table (see FIG. 8A) to select an available record. For example, when the record that is associated with the conference room ID "RoomA" is available in the conference room management table, the relay instruction unit 22 registers the topic name "ConfRoom2" included in the received message with that available record (step S66). As part of the processes in the step S66, the relay instruction unit 22 of the relay device management server 20 registers the pair "C02, U01" of the client ID and the user ID of the communication terminal 10a, which is the request sender of the message, with the relay device management table.

The relay instruction unit 22 of the relay device management server 20 sends conference information including the conference room ID "RoomA", which corresponds to the record selected in the step S66, and the pair "C02, U01" of the client ID and the user ID of the communication terminal 10a, which is the request sender of the message, to the relay device 30 (step S67). The data transmitter and receiver 31 of the relay device 30 receives the conference information sent from the relay device management server 20.

The data transmitter and receiver 31 of the relay device 30 sends the conference room ID "RoomA" to the video communication application B of the communication terminal 10a that is identified by the pair "C02, U01" of the client ID and the user ID. Moreover, the relay device 30 requests the video communication application B of the communication terminal 10a to start exchanging contents of data with the channel of the relay device 30 indicated by the conference room ID "RoomA" (step S68). Accordingly, a session "sed" is established between the video communication application B of the communication terminal 10a and the relay device 30 to exchange contents of data therebetween.

Next, processes after a request to start a phone conversation between the user "a" and the user "c" is accepted in the communication terminal 10c are described. The session controller 17b of the communication terminal 10c requests the management system 50 to publish a message "EnterU02" with the topic name "ConfRoom2" through the pub/sub data transmitter and receiver 11 (step S69). Note that the message "EnterU02" indicates that the video communication application B that the user "c" uses requests to join a conference.

The data transmitter and receiver 51 of the communication management system 50 receives the pub request for messages associated with the above topic name "ConfRoom2". Then, in a similar manner to the step S64, the pub/sub acceptance unit 54 specifies, as a destination of messages, the video communication application A of the communication terminal 10a that has used the pair "C02, U01" of the client ID and the user ID to log into the management system 50 (step S70). In a similar manner to the step S64, the pub/sub acceptance unit 54 specifies, as a destination of messages, the relay device management application of the relay device management server 20 that has used the pair "C03, U04" of the client ID and the user ID to log into the management system 50 (step S70).

The pub/sub acceptance unit 54 of the management system 50 sends the message and the topic name, which are sent from the video communication application B of the communication terminal 10c, to the video communication application B of the communication terminal 10a and the relay device management application of the relay device management server 20, based on the result of the above specifying process (step S71-1, step S71-2). The session controller 17b of the communication terminal 10a, which is implemented by the video communication application B, receives the message sent from the management system 50 through the pub/sub data transmitter and receiver 11. In a similar manner, the pub/sub data transmitter and receiver 21 of the relay device management server 20 receives the message sent from the management system 50.

The relay instruction unit 22 of the relay device management server 20 registers the pair "C02, U03" of the client ID and the user ID of the communication terminal 10c, which is the request sender of the message, with the relay device management table (step S72).

The relay instruction unit 22 of the relay device management server 20 sends conference information including the conference room ID "RoomA", which corresponds to the topic name "ConfRoom2" in the conference room management table (see FIG. 8A), and the pair "C02, U03" of the client ID and the user ID of the communication terminal 10c, which is the request sender of the message, to the relay device 30 (step S73). The data transmitter and receiver 31 of the relay device 30 receives the conference information sent from the relay device management server 20.

The data transmitter and receiver 31 of the relay device 30 sends the conference room ID "RoomA" to the video communication application B of the communication terminal 10c that is identified by the pair "C02, U03" of the client ID and the user ID. Moreover, the relay device 30 requests the video communication application B of the communication terminal 10c to start exchanging contents of data with the channel of the relay device 30 indicated by the conference room ID "RoomA" (step S74). Accordingly, a session "sed" is established between the video communication application B of the communication terminal 10c and the relay device 30 to exchange contents of data therebetween.

Once the session "sed" between the communication terminal 10a and the relay device 30 and the session between the communication terminal 10c and the relay device 30 are established, the relaying unit 32 relays the contents of data such as image data, video data, and audio data sent from one of the communication terminals 10a and 10c to the other one of the communication terminals 10a and 10c. Accordingly, the conversation between the communication terminals 10a and 10c can be started.

Next, the processes in which the communication status of the clients of the communication terminals 10 is managed are described with reference to FIG. 14A and FIG. 14B.

Figure 14A:
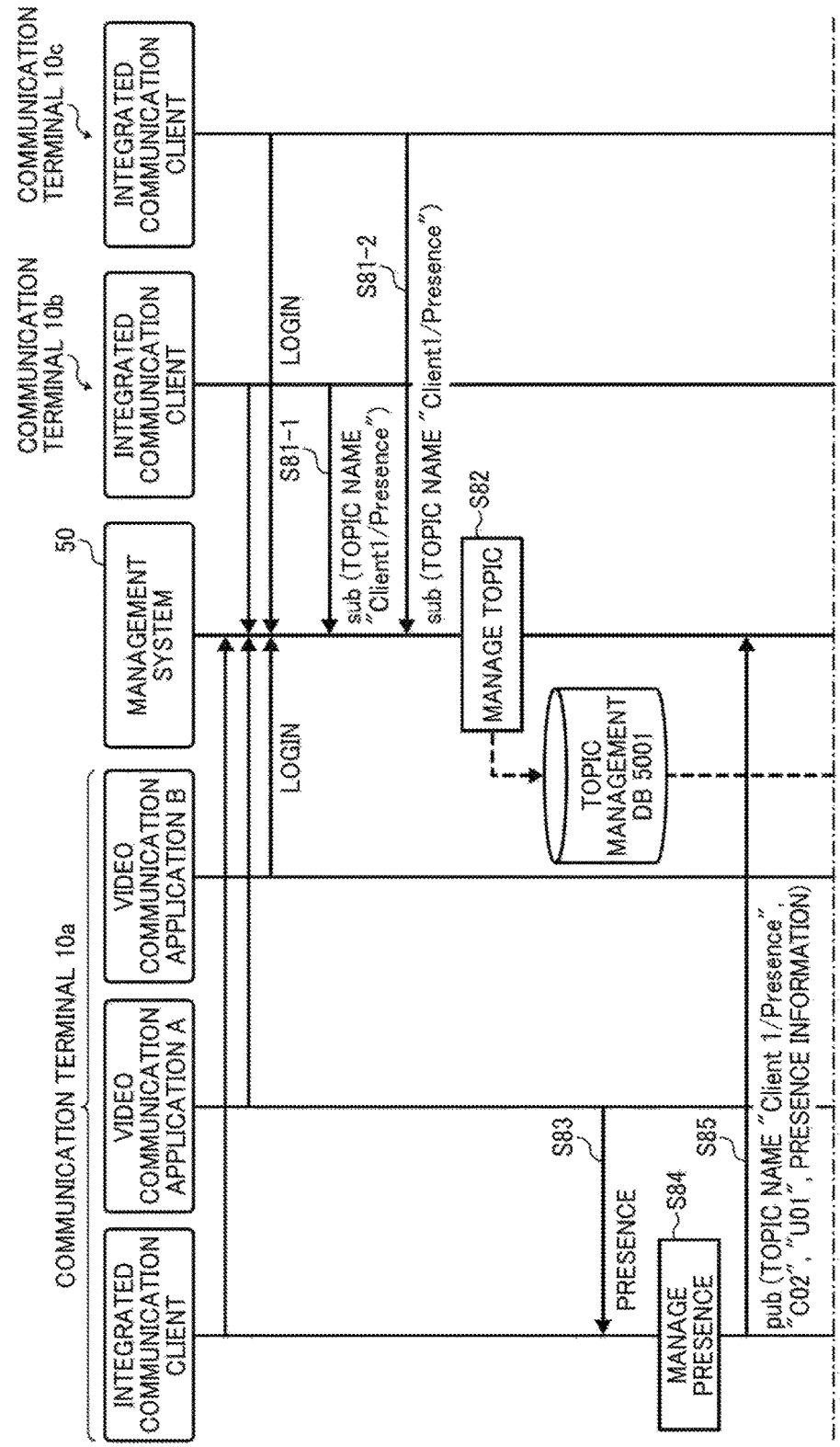
FIG. 14A and FIG. 14B are a data sequence diagram illustrating the operations for managing the communication status of a plurality of communication terminals, according to an embodiment of the present disclosure.
Figure 14B:
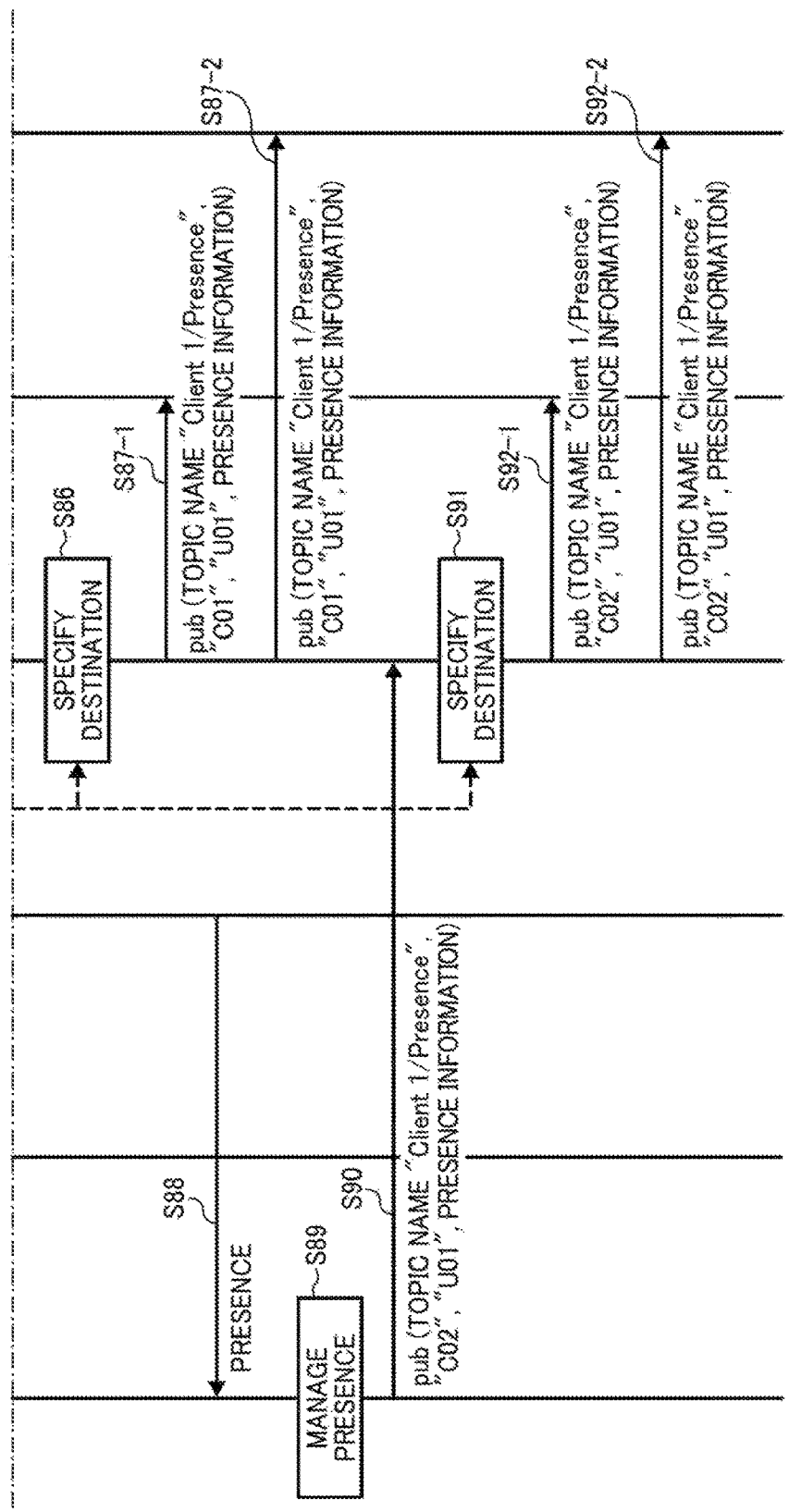

FIG. 14A and FIG. 14B are a data sequence diagram illustrating the operations for managing the communication status of a plurality of communication terminals, according to the present embodiment.

In the following description, the user ID of the user "a", the user ID of the user "b", the user ID of the user "c", and the client ID of the integrated communication client are referred to as "U01", "U02", "U03", and "C04", respectively.

In a similar manner to the processes in the steps S21 to S30 as described above, the client application "video communication applications A and B" of the communication terminal 10a uses the user ID "U01" and the client ID "C01 or C02" to log into the management system 50 through the pub/sub data transmitter and receiver 11. In a similar manner to the processes in the steps S21 to S30 as described above, the integrated communication client of the communication terminals 10a, 10b, and 10c use the user ID "U01, U02, or U03" and the client ID "C04" to log into the management system 50 through the pub/sub data transmitter and receiver 11.

The pub/sub data transmitter and receiver 11 of the communication terminal 10b sends to the management system 50 a sub request to receive messages associated with the topic name "Client1/Presence" (step S81-1). The sub request in the step S81-1 includes the user ID "U02" and the client ID "C04" on the communication terminal 10b side that is the request sender, and the topic name "Client1/Presence". The topic that is identified by the topic name "Client1/Presence" includes presence information that indicates the communication status of the communication terminals 10.

The pub/sub data transmitter and receiver 11 of the communication terminal 10c sends to the management system 50 a sub request to receive messages associated with the topic name "Client1/Presence" (step S81-2). The sub request in the step S81-2 includes the user ID "U03" and the client ID "C04" on the communication terminal 10c side that is the request sender, and the topic name "Client1/Presence".

The data transmitter and receiver 51 of the communication management system 50 receives the sub request sent by the integrated communication client of the communication terminals 10b and 10c. The pub/sub acceptance unit 54 of the management system 50 registers the topic name, the user ID, and the client ID, which are included in the received sub request, in association with each other in the topic management table (step S82). Accordingly, each of the integrated communication clients of the communication terminals 10b and 10c can receive a message that is associated with the topic name "Client1/Presence".

On the other hand, the communication terminal 10a performs control according to a message every time the session controllers 17a and 17b, which are implemented by the video communication application A and the video communication application B, respectively, transmits or receives a call control message through the pub/sub data transmitter and receiver 11. No limitation is intended, but the control that is performed by the communication terminal 10a includes, for example, control to ring dial tone in response to the transmission of a message, control to ring a ringtone in response to the reception of a message, and control to establish communication in response to the reception of a response of communication allowance. Then, the communication terminal 10a sends presence information indicating the communication status of the applications of the communication terminal 10a to presence receiver 13 according to the above control. For example, when the communication is established in response to a call control message, the session controller 17a, which is implemented by the video communication application A, sends to presence receiver 13 the presence information "in session" that indicates the communication status that is changed by the above control (step S83).

Once the presence receiver 13 receives presence information, presence manager 12 stores the client ID of the client application (i.e., the video communication application A) of the request sender of presence information, the user ID of the user of the video communication application A, and the received presence information in association with each other in the memory 1000. Accordingly, the presence of the video communication application A is managed (step S84).

Note that the presence manager 12 may manage the communication status of the client application according to the function of the client application. For example, in cases where the client application is adapted to communication among three sites, when the presence receiver 13 receives the presence information that indicates "in session" for the first time, the presence manager 12 manages the presence information "in session (participation allowed)" that indicates the status of the client application. Then, when presence receiver 13 receives presence information that indicates "in session" for the second time, the presence manager 12 may manage the presence information "in session (participation not allowed)" that indicates the status of the client application.

Moreover, the presence manager 12 may manage the communication status of a client that is different from the source of presence information depending on the implementation of the local communication terminal 10. For example, cases in which each of the video communication application A and the video communication application B can occupy one microphone are described. When presence information indicating "in session" is sent from the session controller 17a, which is implemented by the video communication application A, to presence receiver 13, the microphone 114 that is built into the communication terminal 10 is occupied by the communication performed by the video communication application A. The presence manager 12 determines whether or not an external microphone is connected to the external device connection interface 118. When it is determined that an external microphone is connected to the external device connection interface 118, the presence manager 12 stores in the memory 1000 the client ID "C02" of the video communication application B, the user ID "U01", and presence information "standby" that indicates a state where a conference can be started. On the other hand, when it is determined that an external microphone is not connected to the external device connection interface 118, the presence manager 12 stores in the memory 1000 the client ID "C02" of the video communication application B, the user ID "U01", and presence information "not available" that indicates a state where a conference cannot be started.

Every time new presence information is stored by presence manager 12 or at a prescribed timing, the pub/sub data transmitter and receiver 11 of the communication terminal 10a sends to the management system 50 a pub request to publish the pair of the client ID, the user ID, and presence information stored in the memory 1000 as the topic name "Client1/Presence" (step S85).

The data transmitter and receiver 51 of the communication management system 50 receives the above pub request. Subsequently, the pub/sub acceptance unit 54 uses the topic name "Client1/Presence", which is included in the received pub request, as a search key to searches the topic management table (see FIG. 6D). Then, the pub/sub acceptance unit 54 extracts the pairs "C04, U02" and "C04, U03" of the associated client ID and user ID, and specifies a destination to which a message is to be sent (step S86). In so doing, the pub/sub acceptance unit 54 specifies, as destinations, the integrated communication client of the communication terminal 10b that has used the pair "C04, U02" of the client ID and the user ID to log into the management system 50 as well as the integrated communication client of the communication terminal 10c that has used the pair "C04, U03" of the client ID and the user ID to log into the management system 50.

The pub/sub acceptance unit 54 of the management system 50 sends the message and the topic name, which are sent from the integrated communication client of the communication terminal 10a, to the integrated communication clients of the communication terminals 10b and 10c, based on the result of the above specifying process (steps S87-1 and S87-2). The pub/sub data transmitter and receiver 11 of the communication terminals 10b and the pub/sub data transmitter and receiver 11 of the communication terminal 10c receive the message sent from the management system 50. Accordingly, the communication terminals 10b and 10c can grasp the communication status of the communication terminal 10a for each client application.

The presence management that is performed when the session controller 17a, which is implemented by the video communication application A, transmits or receives a call control message to control the communication by the video communication application A is described as above. The presence management that is performed when the session controller 17b, which is implemented by the video communication application B, transmits or receives a call control message to control the communication by the video communication application B (step S88 to step S92-1 and step S92-2) is similar to the processes in the steps S83 to S87-1 and S87-2) as above, and thus the description is omitted.

Next, cases are described with reference to FIG. 15 in which when the communication at one of the communication terminals 10 is disconnected, the counterpart communication terminal 10 is notified of such a disconnected communication at one of the communication terminals 10.

Figure 15:
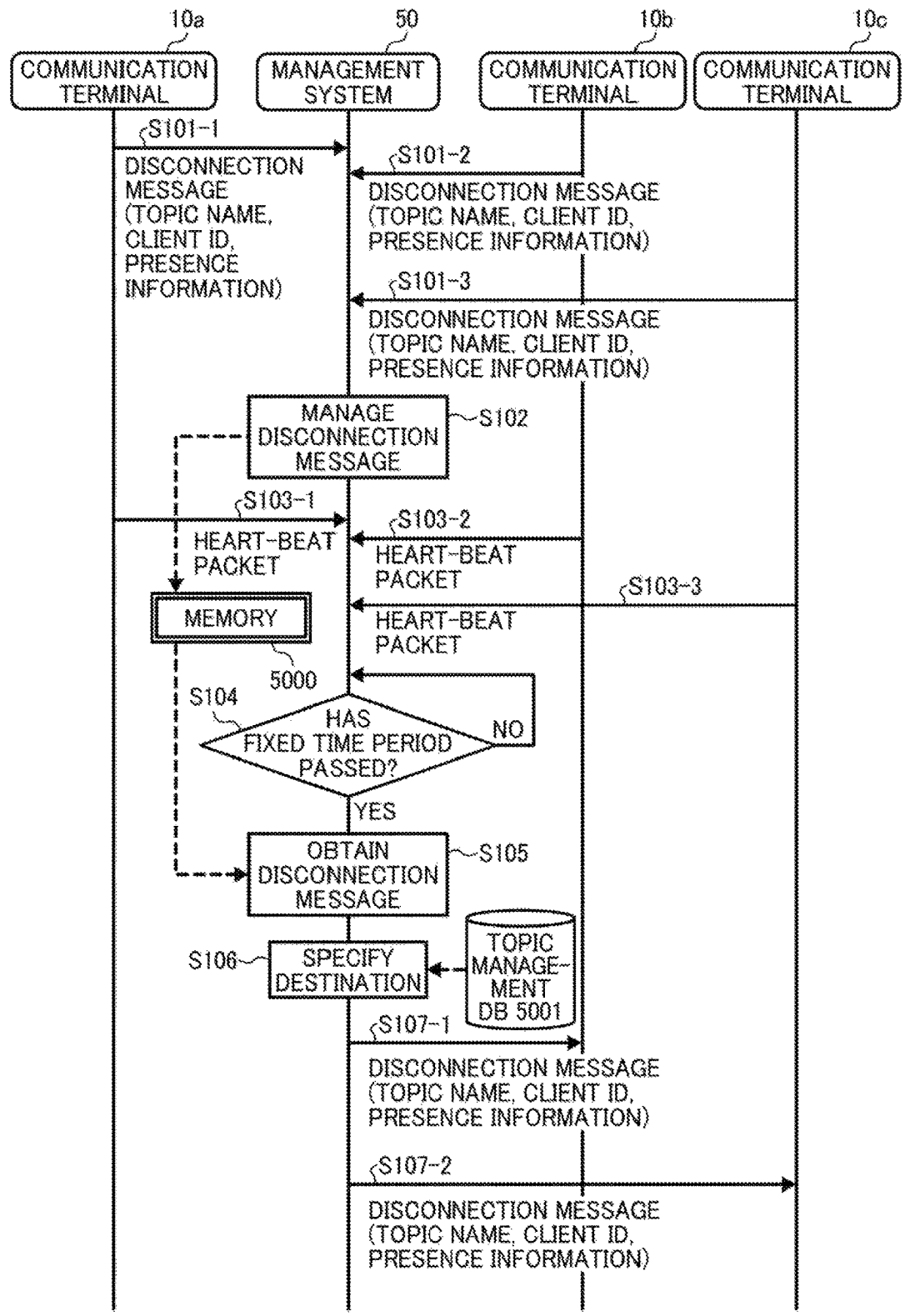
FIG. 15 is a sequence diagram of the operations for the notification of disconnected communication, according to an embodiment of the present disclosure.

FIG. 15 is a sequence diagram of the operations for the notification of disconnected communication, according to the present embodiment.

The operations after the video communication application A of the communication terminal 10a starts communicating with the video communication application A of the communication terminal 10b (see FIG. 10) and the video communication application B of the communication terminal 10a starts communicating with the video communication application B of the communication terminal 11c (see FIG. 12), as described above, are explained. In the following description, processes that are performed when the communication at the communication terminal 10a is disconnected are explained. However, similar processes may be performed in the communication system 1 when the communication at the other communication terminals 10b and 10c is disconnected.

When the communication of the communication terminal 10a is disconnected, the pub/sub data transmitter and receiver 11 of the communication terminal 10a sends a disconnection message to the management system 50 (step S101-1). Note that such a disconnection message is to be transferred to a counterpart communication terminal 10. In so doing, the pub/sub data transmitter and receiver 11 includes a topic name "Client1/Presence" for publishing and being subscribed to the presence information of the communication terminals 10a, client ID "C01, C02" indicating all the video communication applications A and B running in the communication terminal 10a, user ID "U01, U01" indicating the users of the video communication applications A and B of the communication terminal 10a, and presence information "not available, not available" of the video communication applications A and B indicating a communication-disconnected status into the disconnection message. Accordingly, the data transmitter and receiver 51 of the management system 50 receives a disconnection message including a group of topic name, client ID, user ID, and presence information.

In a similar manner to the step S101-1, the pub/sub data transmitter and receiver 11 of the communication terminal 10b also sends a disconnection message to the management system 50 (step S101-2). In so doing, the pub/sub data transmitter and receiver 11 of the communication terminal 10b includes a topic name for publishing and being subscribed to the presence information of the communication terminals 10b, client ID indicating the video communication application A running in the communication terminal 10b, user ID indicating the user of the video communication application A of the communication terminal 10b, and presence information of the video communication application A indicating a communication-disconnected status into the disconnection message.

In a similar manner to the step S101-1, the pub/sub data transmitter and receiver 11 of the communication terminal 10c also sends a disconnection message to the management system 50 (step S101-3). In so doing, the pub/sub data transmitter and receiver 11 of the communication terminal 10c includes a topic name for publishing and being subscribed to the presence information of the communication terminals 10c, client ID indicating the video communication application B running in the communication terminal 10c, user ID indicating the user of the video communication application B of the communication terminal 10c, and presence information of the video communication application B indicating a communication-disconnected status into the disconnection message.

The data processor 59 of the management system 50 stores the disconnection messages each of which is received in the steps S101-1, S101-2, and S101-3 in the memory 5000 (step S102).

While the communication terminal 10a is connected to the communication network 2, the pub/sub data transmitter and receiver 11 of the communication terminal 10a sends a heart-beat packet to the management system 50 at prescribed time intervals, for example, once every three seconds (step S103-1). Note that such time intervals are determined in advance in the communication system 1. Note also that the heart-beat packet is information used by the management system 50 to determine whether the communication terminal 10a is connected to the communication network 2, and the heart-beat packet may include any kinds of information. In a similar manner to the above, while the communication terminals 10b and 10c are connected to the communication network 2, each of the communication terminals 10b and 10c sends a heart-beat packet to the management system 50 at prescribed time intervals (steps S103-2 and S103-3).

The data transmitter and receiver 51 of the management system 50 receives the heart-beat packets sent from the communication terminals 10a, 10b, and 10c. In the arrangement described above, the data transmitter and receiver 51 determines, for each of the communication terminals 10, whether a fixed time period, for example, thirty seconds, which is longer than the prescribed time intervals as described above, has passed since the time when a heart-beat packet was previously received (step S104). For example, when a new heart-beat packet is received from the communication terminal 10a before a fixed time period has passed since a heart-beat packet was previously received from the communication terminal 10a ("NO" in the step S104), the data transmitter and receiver 51 determines that the communication terminal 10a is connected to the communication network 2, and repeats the process in the step S104.

When a new heart-beat packet is not received from the communication terminal 10a after a fixed time period has passed since a heart-beat packet was previously received from the communication terminal 10a ("YES" in the step S104), the data transmitter and receiver 51 of the management system 50 determines that the communication terminal 10a is disconnected from the communication network 2.

In response to the determination that the communication terminal 10a is disconnected from the communication network 2, the pub/sub acceptance unit 54 of the management system 50) retrieves from the memory 5000 the disconnection message sent from the communication terminal 10a to the management system 50 in the step S101-1 (step S105).

Subsequently, the pub/sub acceptance unit 54 of the management system 50 uses the topic name "Client1/Presence", which is included in the retrieved disconnection message, as a search key to search the topic management table (see FIG. 6D). By performing these processes as described above, the pub/sub acceptance unit 54 extracts the pairs "C04, U02" and "C04, U03" of the associated client ID and user ID. The pub/sub acceptance unit 54 specifies, as destinations to which a disconnection message is to be sent, the integrated communication client of the communication terminal 10b that has used the pair "C04, U02" of the client ID and the user ID to log into the management system 50 as well as the integrated communication client of the communication terminal 10c that has used the pair "C04, U03" of the client ID and the user ID to log into the management system 50, among the pairs of extracted client ID and user ID (step S106).

The pub/sub acceptance unit 54 of the management system 50 sends the disconnection message of the communication terminal 10a, which is obtained in the step S105, to the integrated communication clients of the communication terminals 10b and 10c, based on the result of the above specifying process (steps S107-1 and S107-2). The pub/sub data transmitter and receiver 11 of the communication terminals 10b and the pub/sub data transmitter and receiver 11 of the communication terminal 10c receive the disconnection message sent from the management system 50. Accordingly, the communication terminals 10b and 10c can grasp the communication status of the communication terminal 10a for each client application.

Next, operations for changing the display of a user interface (UI) image when the integrated communication clients of the communication terminals 10 receive presence information, for example, in the steps S83, S88, S107-1, and S107-2 is described with reference to FIG. 16.

Figure 16:
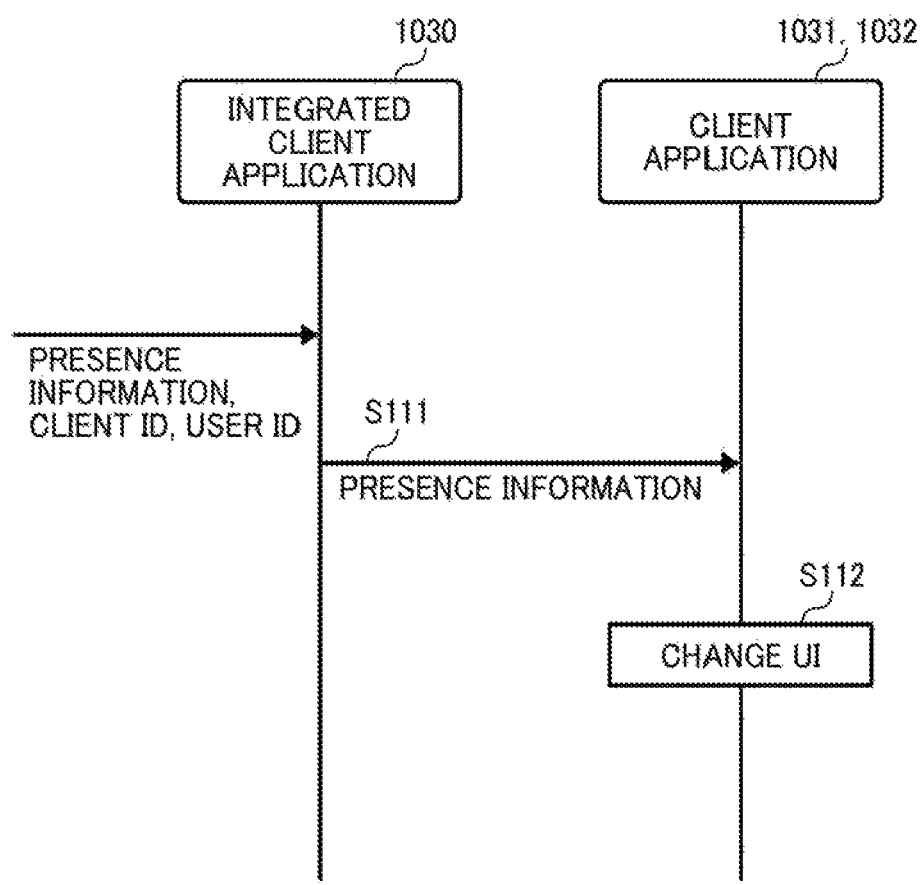
FIG. 16 is a data sequence diagram illustrating operations for changing the display of a user interface (UI) image, according to an embodiment of the present disclosure.

FIG. 16 is a data sequence diagram illustrating operations for changing the display of the UI image, according to the present embodiment.

Note also that the processes performed within the communication terminal 10 when the communication terminal 10 has received the presence information are illustrated in FIG. 16.

In the step S83 as described above, the integrated communication client of the communication terminal 10*a* receives the presence information "in session" that indicates the communication status of the video communication application A. If the microphone 114 that is provided for the communication terminal 10*a* is occupied when the video communication application A is in a state of "in session", the other video communication application B becomes unavailable. Accordingly, in the step S84, the presence manager 12 stores in the memory 1000 the client ID "C02" of the video communication application B, the user ID "U01", and presence information "not available" that indicates a state where a conference cannot be started.

The presence manager 12 of the communication terminal 10*a* sends the client ID "C02", the user ID "U01", and the presence information "not available" that indicates a state where a conference cannot be started, each of which is stored in the memory 1000 in the step S84, to the video communication application B that is a client application whose presence information is "not available" (step S111).

Based on the received client ID and the presence information, the session controller 17*b* of the communication terminal 10*a* determines that the video communication application B has become "not available". According to this determination, the session controller 17*b* of the communication terminal 10 no longer accepts a request to start a phone conversation, and changes the UI image (S112) and outputs the changed UI image to the display 120. The changing of the UI image includes, for example, deletion of a key to accept a request to start a phone conversation, and an operation for reducing the brightness of an icon to accept a request to start a phone conversation. As the UI image is changed, the session controller 17*b* no longer accepts a request to start a phone conversation.

Next, alternative operations for changing the display of a UI image when the integrated communication clients of the communication terminals 10 receive presence information are described. Firstly, in step S107-1 as described above, the integrated communication client of the communication terminal 10*b* receives the disconnection message that includes the presence information of the video communication application A and the video communication application B of the communication terminal 10*a*. Secondly, presence manager 12 of the communication terminal 10*b* sends the received disconnection message to the video communication application A that operates in the local communication terminal (step S111).

As part of the operation in the step S111, the session controller 17*a* of the communication terminal 10*b* extracts, from the information included in the received disconnection message, the client ID "C0" that indicates the video communication application A, the user ID "U01" that indicates the user of the video communication application A in the communication terminal 10*a*, and the presence information "not available" of the video communication application A indicating a communication-disconnected status, as information of a counterpart application that can be called from an application of the local communication terminal. Note that the above operation is applicable to cases in which a video communication application can call another video communication application of the same type. When a video communication application can call another compatible video communication application in the communication system 1, the session controller 17*a* of the communication terminal 10*b* may extract from the disconnection message the information about an application compatible with the video communication application A of the local communication terminal.

The session controller 17*a* of the communication terminal 10*b* determines that it is not possible to call the video communication application A of the counterpart communication terminal that the user ID "U01" uses, based on the client ID "C01", the user ID "U01" and the presence information "not available" that indicates a state where a conference cannot be started, each of which is extracted in the step S111. Accordingly, the session controller 17*b* of the communication terminal 10 no longer accepts a request to start a phone conversation with the user a that is identified by the user ID "U01", and changes the UI image (S112) and outputs the changed UI image to the display 120. The changing of the UI image includes, for example, deletion of the information about the user a from the contact list, and an operation for reducing the brightness of the display of the user a in the contact list. As the UI image is changed, the session controller 17*b* no longer accepts a request to start a phone conversation with the user a.

With the data transmission method according to the embodiments described above, the communication terminal 10 is connected to the management system 50 that manages the communication, and communicates with a counterpart communication terminal 10 that is connected to the management system 50. The pub/sub data transmitter and receiver 11 of the communication terminal 10 sends, at a prescribed timing, a heart-beat packet to the management system 50. Note that the pub/sub data transmitter and receiver 11 is an example of a first transmitter, the heart-beat packet is an example of first information, and that this transmission process is an example of a transmitting process. The pub/sub data transmitter and receiver 11 of the communication terminal 10 transmits to the management system 50 a disconnection message to be sent from the management system 50 to a counterpart communication terminal 10, when the management system 50 does not receive a heart-beat packet for a prescribed length of time. Note that the pub/sub data transmitter and receiver 11 is an example of a second transmitter, the disconnection message is an example of second information, and that this transmission process is an example of a second transmitting process. The disconnection message includes the presence information of a plurality of video communication applications A and B that operate in the communication terminal 10. Note that each of the video communication application A and B is an example of a communication application, and that the presence information is an example of a status information that indicates the status of each of the video communication applications A and B. Accordingly, it becomes not necessary to send a heart-beat packet for each of the video communication applications A and B, and the load on the communication network 2 is reduced.

The pub/sub data transmitter and receiver 11 of the counterpart communication terminal 10 sends, at a prescribed timing, a heart-beat packet to the management system 50. The pub/sub data transmitter and receiver 11 of the counterpart communication terminal 10 transmits to the management system 50 a disconnection message to be sent from the management system 50 to the communication terminal 10, when the management system 50 does not receive a heart-beat packet sent from the counterpart communication terminal 10 for a prescribed length of time. The disconnection message may include the presence information of a plurality of video communication applications that operate in the counterpart communication terminal 10. Due to this configuration, even when a plurality of video communication applications operates in each of the communication terminals 10 of the communication system 1, one heart-beat packet is transmitted for each one of the communication terminals 10. Accordingly, the load on the communication network 2 is reduced.

When an application to which a request to start video communication can be sent from one of the video communication applications that operate in the communication terminal 10 is included in a plurality of video communication applications that operate in the counterpart communication terminal 10, the session controller 17 of the communication terminal 10 stops to accept a request to start video communication for the application to which a request to start video communication can be sent, based on a received disconnection message. Accordingly, a call to an unavailable application can be stopped, and the load on the communication network 2 is reduced.

The disconnection message that is sent to the communication terminal 10 includes the client ID of each of the multiple video communication applications that operate in the counterpart communication terminal 10. The session controller 17 of the communication terminal 10 stops to accept a request to start video communication for the application specified by the client ID included in the disconnection message. Note that the session controller 17 is an example of a stopper. Due to this configuration, even when a plurality of video communication applications operates in the counterpart communication terminal 10, the session controller 17b of the communication terminal 10 can determine for what application a request to start video communication should no longer be accepted.

The data transmitter and receiver 51 of the management system 50 receives a heart-beat packet and a disconnection message. Note that the data transmitter and receiver 51 is an example of a first receiver and a second receiver, and that this reception process is an example of a first receiving process and a second receiving process. When the pub/sub data transmitter and receiver 11 of the management system 50 does not receive a heart-beat packet sent from the communication terminal 10 for a prescribed length of time, the pub/sub acceptance unit 54 of the management system 50 transmits a disconnection message to the counterpart communication terminal 10. Note that the pub/sub acceptance unit 54 is an example of a transmitter, and that this transmission process is an example of a transmitting process. Accordingly, the management system 50 can notify the counterpart communication terminal 10 of the disconnected communication at the communication terminal 10.

The control programs for the communication terminal 10, the relay device management server 20, the relay device 30, the authentication server 40, and the management system 50 may be recorded in a file in a format installable or executable on a computer-readable recording medium such as the recording medium 106 for distribution. Examples of such recording medium include, but not limited to, compact disc-recordable (CD-R), digital versatile disc (DVD), and Blu-ray disc.

Note also that a recording medium such as a CD-ROM storing the programs according to the example embodiment as described above or the HD 504 storing these programs may be distributed as a program product at home and abroad.

The communication terminal 10, the relay device management server 20, the relay device 30, the authentication server 40, and the management system 50 according to the embodiment as described above may be configured by a single computer or a plurality of computers to which functions or units are allocated as desired in a divided manner. Alternatively, the authentication server 40 and the management system 50 may be implemented by a single computer (one or more processors).

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. The processing circuit herein includes, for example, devices such as a processor that is programmed to execute software to implement functions, like a processor with electronic circuits, an application specific integrated circuit (ASIC) that is designed to execute the above functions, and a circuit module known in the art.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A communication terminal that is connectable to a counterpart communication terminal and a management system via a network, the communication terminal comprising:

a plurality of client communication applications, wherein each client communication application is associated with a distinct identification, wherein each of the plurality of client communication applications is in communication with a respective client communication application of the counterpart communication terminal of the same distinct identification;

a publish-subscribe, pub/sub, data transmitter and receiver configured to:
  transmit, at a prescribed timing, first information to the management system that manages communication between the communication terminal and the counterpart communication terminal; and
  transmit to the management system second information to be sent from the management system to the counterpart communication terminal connected to the management system through the network, when the management system does not receive the first information for a prescribed length of time,
wherein the first information is used by the management system to determine whether the communication terminal is connected to the network, wherein the second information is a disconnection message, the disconnection message including presence information of each of the plurality of client communication applications that operate in the communication terminal; and an integrated client application configured to:
  include the publish-subscribe, pub/sub, data transmitter and receiver; and
  manage the presence information that indicates status of each of plurality of the client communication applications based on the information sent from each of the plurality of client communication applications.

2. A communication system comprising:
a first communication terminal that is connectable to a second communication terminal and a management system via a network;
the second communication terminal,
wherein the first communication terminal includes:
a plurality of client communication applications, wherein each client communication application is associated with a distinct identification, wherein each of the plurality of client communication applications is in communication with a respective client communication application of the second communication terminal of the same distinct identification;
a publish-subscribe, pub/sub, data transmitter and receiver configured to:
   transmit, at a prescribed timing, first information to the management system that manages communication between the first communication terminal and the second communication terminal; and
   transmit to the management system second information to be sent from the management system to the second communication terminal connected to the management system through the network, when the management system does not receive the first information for a prescribed length of time,
wherein the first information is used by the management system to determine whether the first communication terminal is connected to the network, wherein the second information is a disconnection message, the disconnection message including presence information of each of the plurality of client communication applications that operate in the first communication terminal; and
an integrated client application configured to:
   include the publish-subscribe, pub/sub, data transmitter and receiver; and
   manage the presence information that indicates status of each of plurality of the client communication applications based on the information sent from each of the plurality of client communication applications;
wherein the second communication terminal includes a second transmitter that transmits to the management system the second information to be sent from the management system to the first communication terminal connected to the management system through the network, when the management system does not receive the first information to be sent from the second communication terminal for the prescribed length of time.

3. The communication system according to claim 2, wherein
the first communication terminal comprises circuitry to stop one of the plurality of communication applications that operate in the second communication terminal capable of processing a request to start video communication from one of the plurality of applications that operate in the first communication terminal, from accepting the request, based on the second information.

4. The communication system according to claim 3, wherein
the second information to be sent to the second communication terminal includes identification information of each of the plurality of communication applications that operate in the second communication terminal, and
the circuitry stops to accept the request to start video communication based on the identification information.

5. The communication system according to claim 2, further comprising the management system.

6. The communication system according to claim 5, wherein
the management system comprises:
a receiver to receive any one of the first information and the second information; and
a third transmitter to transmit the second information sent from the first communication terminal to the second communication terminal, when the receiver does not receive the first information to be sent from the first communication terminal for the prescribed length of time.

7. A method comprising:
a plurality of client communication applications of a communication terminal, each associated with a distinct identification, communicating with a respective client communication application of a counterpart communication terminal of the same distinct identification;
transmitting, at a prescribed timing, first information to a management system that manages communication between the communication terminal and the counterpart communication terminal;
transmitting to the management system second information to be sent from the management system to the counterpart communication terminal connected to the management system through a network, when the management system does not receive the first information for a prescribed length of time,
wherein the first information is used by the management system to determine whether the communication terminal is connected to the network, wherein the second information is a disconnection message, the disconnection message including presence information of each of the client communication applications that operate in the communication terminal; and
managing the presence information that indicates status of each of the client communication applications based on the information sent from each of the client communication applications.

8. The method according to claim 7, further comprising:
determining whether any one of the first information and the second information is received at the management system.

* * * * *